US010373267B2

(12) United States Patent
Chang et al.

(10) Patent No.: US 10,373,267 B2
(45) Date of Patent: Aug. 6, 2019

(54) USER DATA AUGMENTED PROPENSITY MODEL FOR DETERMINING A FUTURE FINANCIAL REQUIREMENT

(71) Applicants: Eva Diane Chang, Mountain View, CA (US); Madhu Shalini Iyer, Fremont, CA (US); Jeffrey Lewis Kaufman, Mountain View, CA (US)

(72) Inventors: Eva Diane Chang, Mountain View, CA (US); Madhu Shalini Iyer, Fremont, CA (US); Jeffrey Lewis Kaufman, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 381 days.

(21) Appl. No.: 15/143,485

(22) Filed: Apr. 29, 2016

(65) Prior Publication Data

US 2017/0316511 A1    Nov. 2, 2017

(51) Int. Cl.
     *G06Q 40/00*      (2012.01)
     *G06Q 10/06*      (2012.01)

(52) U.S. Cl.
     CPC ....... *G06Q 40/12* (2013.12); *G06Q 10/06375* (2013.01)

(58) Field of Classification Search
     CPC .. G06Q 40/12; G06Q 10/06375; G06Q 20/10; G06Q 10/08
     USPC ........ 705/30, 35, 14.66, 7.28, 7.11, 38, 319; 235/379, 380; 700/999.101, 97
     See application file for complete search history.

(56) References Cited

U.S. PATENT DOCUMENTS

| | | | |
|---|---|---|---|
| 7,668,776 B1 | 2/2010 | Ahles | |
| 7,954,698 B1 * | 6/2011 | Pliha | G06Q 40/02 235/379 |
| 8,180,713 B1 | 5/2012 | Rigby et al. | |
| 8,538,840 B2 | 9/2013 | Chan et al. | |
| 8,751,273 B2 * | 6/2014 | Pinto | G06F 17/50 705/7.11 |
| 9,213,990 B2 * | 12/2015 | Adjaoute | G06Q 20/4016 |

(Continued)

OTHER PUBLICATIONS

International Search Report and Written Opinion issued in corresponding International Application No. PCT/US2017/029745 dated Jun. 28, 2017 (13 pages).

(Continued)

*Primary Examiner* — Vanel Frenel
(74) *Attorney, Agent, or Firm* — Ferguson Braswell Fraser Kubasta PC

(57) ABSTRACT

A method for determining a future financial requirement of a business entity. The method includes obtaining a propensity model that models how data of a business entity relates to a future financial requirement. Also, the method includes gathering the data of the business entity. The data includes financial data of the business entity, and metadata describing use of a platform by users associated with the business entity. The data matches at least a subset of the propensity model. Further, the method includes scoring the business entity by applying the propensity model to the data of the business entity. In addition, the method includes generating, based on the score of the business entity, a classification of the future financial requirement of the business entity. Still yet, the method includes transmitting a message to the business entity based on the classification of the future financial requirement of the business entity.

23 Claims, 11 Drawing Sheets

(56) References Cited

U.S. PATENT DOCUMENTS

| | | | |
|---|---|---|---|
| 9,471,729 B1* | 10/2016 | Terry | G06F 17/5009 |
| 9,721,296 B1 | 8/2017 | Chrapko | |
| 2002/0198822 A1 | 12/2002 | Munoz et al. | |
| 2003/0172084 A1* | 9/2003 | Holle | G06Q 30/02 |
| 2004/0133439 A1 | 7/2004 | Noetzold et al. | |
| 2007/0016501 A1 | 1/2007 | Chatterji et al. | |
| 2007/0067208 A1 | 3/2007 | Haggerty et al. | |
| 2007/0067209 A1 | 3/2007 | Haggerty et al. | |
| 2007/0078741 A1 | 4/2007 | Haggerty et al. | |
| 2007/0265907 A1 | 11/2007 | Adduci et al. | |
| 2008/0228541 A1 | 9/2008 | Megdal et al. | |
| 2008/0228606 A1 | 9/2008 | Megdal et al. | |
| 2009/0132448 A1 | 5/2009 | Eder | |
| 2012/0078766 A1 | 3/2012 | Rose et al. | |
| 2012/0109710 A1* | 5/2012 | Rahman | G06F 17/30867 |
| | | | 705/7.31 |
| 2012/0278767 A1 | 11/2012 | Stibel et al. | |
| 2013/0006825 A1* | 1/2013 | Robida | G06Q 20/10 |
| | | | 705/35 |
| 2013/0041781 A1* | 2/2013 | Freydberg | G06Q 30/06 |
| | | | 705/27.1 |
| 2014/0214482 A1* | 7/2014 | Williams | G06Q 30/00 |
| | | | 705/7.29 |
| 2014/0258094 A1 | 9/2014 | Jouhikainen et al. | |
| 2014/0289096 A1 | 9/2014 | Montgomery | |
| 2015/0006294 A1* | 1/2015 | Irmak | G06Q 50/01 |
| | | | 705/14.66 |
| 2015/0220999 A1 | 8/2015 | Thornton et al. | |
| 2015/0324715 A1* | 11/2015 | Nelson | G06Q 10/0838 |
| | | | 705/7.28 |
| 2016/0063545 A1 | 3/2016 | Deng | |
| 2016/0070908 A1* | 3/2016 | Sanghvi | G06F 21/554 |
| | | | 726/23 |
| 2017/0244796 A1* | 8/2017 | Liu | G06F 3/0481 |
| 2017/0308958 A1 | 10/2017 | Rieth et al. | |
| 2017/0308960 A1 | 10/2017 | Mascaro et al. | |
| 2018/0114128 A1 | 4/2018 | Libert et al. | |

OTHER PUBLICATIONS

Woodie, Alex, How Intuit Personalizes Turbo Tax Experiences with Big Data; Datanami (https://www.datanami.com) Apr. 15, 2016 (3 pages).

International Search Report and Written Opinion of the International Searching Authority issued in application No. PCT/US2017/028476 (7 pages).

International Preliminary Report on Patentability issued in application No. PCT/US2017/028476 (6 pages).

International Preliminary Report on Patentability issued in application No. PCT/US2017/029745 (8 pages).

International Search Report and Written Opinion of the International Searching Authority issued in application No. PCT/US2017/033148 (9 pages).

International Preliminary Report on Patentability issued in application No. PCT/US2017/033148 (7 pages).

* cited by examiner

USER DATA AUGMENTED PROPENSITY MODEL FOR DETERMINING A FUTURE FINANCIAL REQUIREMENT

CROSS-REFERENCE TO RELATED APPLICATIONS

This application is related to: U.S. patent application Ser. No. _____, filed MONTH DAY, 2016, entitled "Propensity Model for Determining a Future Financial Requirement"; U.S. patent application Ser. No. _____, filed MONTH DAY, 2016, entitled "Externally Augmented Propensity Model for Determining a Future Financial Need"; U.S. patent application Ser. No. _____, filed MONTH DAY, 2016, entitled "System and Method for Providing Financing based on a Propensity Model"; U.S. patent application Ser. No. _____, filed MONTH DAY, 2016, entitled "System and Method for Providing Financing based on a Propensity Model"; U.S. patent application Ser. No. _____, filed MONTH DAY, 2016, entitled "Providing A Recommendation Based on Propensity Model Output, and Optimal Financing Vehicle"; and U.S. patent application Ser. No. _____, filed MONTH DAY, 2016, entitled "Providing A Recommendation Based on Propensity Model Output, and Optimal Financing Vehicle".

BACKGROUND

For growing businesses, access to financial resources is key to continue or increase growth. However, many growing businesses fail to realize that continued growth will likely put them in a position of financial need sometime in the near future. Thus, by the time many growing businesses initiate a process to obtain financing, they are at a disadvantage. For example, the process of applying for and obtaining a low interest rate business loan can be a burdensome and protracted experience. Consequently, a growing business may be forced to choose between a higher interest rate short-term loan, or stunting continued business growth by delaying some business activities until a lower interest rate loan can be obtained.

SUMMARY

In general, in one aspect, the invention relates to a method for determining a future financial requirement of a business entity. The method includes obtaining a propensity model. The propensity model models how data of a business entity relates to a future financial requirement of the business entity. Also, the method includes gathering the data of the business entity. The data includes financial data of the business entity, and includes metadata describing use of a platform by one or more users associated with the business entity. The data matches at least a subset of the propensity model. Further, the method includes scoring the business entity by applying the propensity model to the data of the business entity. In addition, the method includes generating, based on the score of the business entity, a classification of the future financial requirement of the business entity. Still yet, the method includes transmitting a message to the business entity based on the classification of the future financial requirement of the business entity.

In general, in one aspect, the invention relates to a system for determining a future financial requirement of a business entity. The system includes a hardware processor and memory. Also, the system includes software instructions stored in the memory. The software instructions are configured to execute on the hardware processor, and, when executed by the hardware processor, cause the hardware processor to obtain a propensity model. The propensity model models how data of a business entity relates to a future financial requirement of the business entity. Also, when executed by the hardware processor, the software instructions cause the hardware processor to gather the data of the business entity. The data includes financial data of the business entity, and includes metadata describing use of a platform by one or more users associated with the business entity. The data matches at least a subset of the propensity model. Furthermore, when executed by the hardware processor, the software instructions cause the hardware processor to score the business entity by applying the propensity model to the data of the business entity. Additionally, when executed by the hardware processor, the software instructions cause the hardware processor to generate, based on the score of the business entity, a classification of the future financial requirement of the business entity. Still yet, when executed by the hardware processor, the software instructions cause the hardware processor to transmit a message to the business entity based on the classification of the future financial requirement of the business entity.

In general, in one aspect, the invention relates to a non-transitory computer readable medium for determining a future financial requirement of a business entity. The non-transitory computer readable medium stores instructions which, when executed by a computer processor, comprise functionality for obtaining a propensity model. The propensity model models how data of a business entity relates to a future financial requirement of the business entity. Also, the non-transitory computer readable medium stores instructions which, when executed by the computer processor, comprise functionality for gathering the data of the business entity. The data includes financial data of the business entity, and includes metadata describing use of a platform by one or more users associated with the business entity. The data matches at least a subset of the propensity model. In addition, the non-transitory computer readable medium stores instructions which, when executed by the computer processor, comprise functionality for scoring the business entity by applying the propensity model to the data of the business entity. Further, the non-transitory computer readable medium stores instructions which, when executed by the computer processor, comprise functionality for generating, based on the score of the business entity, a classification of the future financial requirement of the business entity. Still yet, the non-transitory computer readable medium stores instructions which, when executed by the computer processor, comprise functionality for transmitting a message to the business entity based on the classification of the future financial requirement of the business entity.

Other aspects and advantages of the invention will be apparent from the following description and the appended claims.

DETAILED DESCRIPTION

Figure 1A:
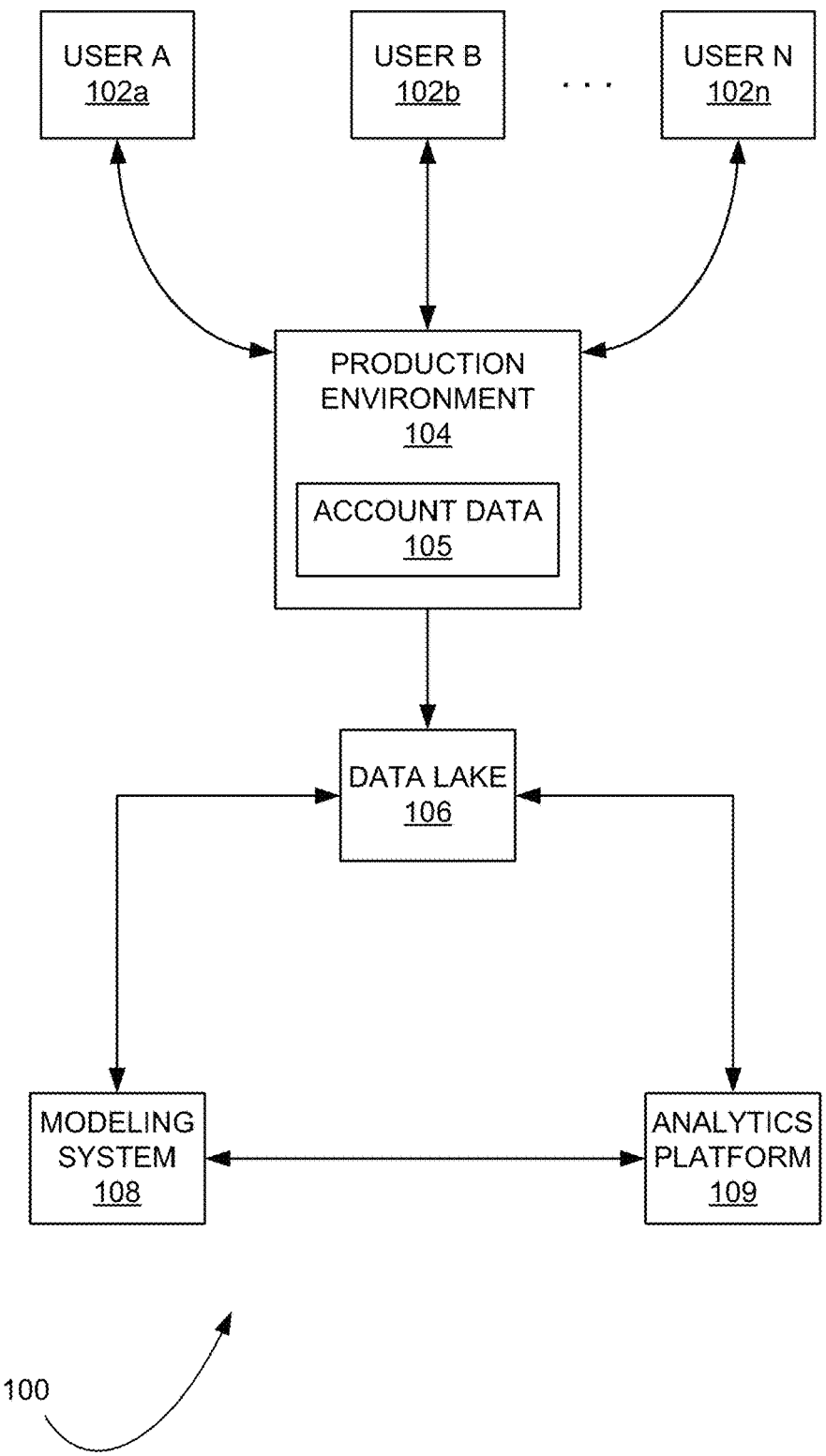
FIGS. 1A, 1B, and 1C illustrate systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

FIG. 1A, depicts a schematic block diagram of a system (100) for determining a future financial requirement, in accordance with one or more embodiments of the invention. In one or more embodiments of the invention, one or more of the elements shown in FIG. 1A may be omitted, repeated, and/or substituted. Accordingly, embodiments of the invention should not be considered limited to the specific arrangements of modules shown in FIG. 1A.

As illustrated in FIG. 1A, the system 100 includes a production environment (104), a data lake (106), an analytics platform (109), and a modeling system (108). The production environment (104) is in communication with a plurality of users (102). Also, the production environment (104) stores account data (105). Further, the production environment (104) is in communication with the data lake (106), and the data lake (106) is in communication with the analytics platform (109) and the modeling system (108). Also, the analytics platform (109) is shown in communication with the modeling system (108).

In one or more embodiments, the production environment (104), the data lake (106), the analytics platform (109), and the modeling system (108) may be separate physical computing systems that communicate via one or more computer networks. Similarly, the users (102) may communicate with the production environment (104) via one or more computer networks. As non-limiting examples, the computer network(s) may include wired and/or wireless portions of public and/or private data networks, such as wide area networks (WANs), local area networks (LANs), the Internet, etc.

In one or more embodiments, the production environment (104) includes any computing environment that provides for the real-time execution of a platform by users (102) of the platform. The production environment (104) may include processes, data, computational hardware, and software that perform specific tasks. The tasks may be performed by the production environment (104) on behalf of the users, in furtherance of organizational or commercial objectives of the users. For example, the production environment (104) may host a financial management platform that is used by the users. Specifically, the financial management platform may be utilized by the users to operate a business, such as, for example, by performing accounting functions, running payroll, calculating tax liabilities, billing customers, creating invoices, etc. More specific example of financial management platforms include Intuit QuickBooks, Intuit TurboTax, etc.

As an option, the users of the platform may include individuals or clients that connect to the production environment (104) on behalf of respective businesses (i.e., "business entities"). Accordingly, each of the users (102a-102n) may include an individual operating a desktop computer, portable computer (e.g., laptop, netbook, etc.), or mobile device (e.g., tablet computer, cellular phone, smartphone, etc.), etc., to access the production environment (104) on behalf of a business entity. Each of the users (102a-102n) may utilize a local application (e.g., web browser) for accessing the production environment (104). Moreover, the users or business entities operating on the platform may pay for access to, and use of, the platform, such as, for example, in a subscription model.

In one or more embodiments, the production environment (104) may store account data (105). The account data (105) includes any information stored on the production environment (104) that is associated with, or utilized in the course of, a user's (102) interaction with a platform executing on the production environment (104). For example, where the production environment (104) includes a financial management platform executing thereon, and the financial management platform is utilized by user A (102a) for managing the operation of a business, then the account data (105) may include invoicing information, billing information, inventory information, payroll information, and/or user access metadata, etc. For purposes of simplicity, this data may herein be referred to as "business entity data."

In one or more embodiments, the data lake (106) includes any large-scale data storage system. The data lake (106) may include structured and/or unstructured data. For example, the data-lake may store tables, objects, files, etc. In one or more embodiments, the data lake (106) includes a copy of the account data (105) of the production environment (104). For example, as the users (102) utilize a platform of the production environment (104), changes to the account data (105) may be duplicated or pushed to copies located in the data lake (106). As described in more detail below, contents of the data lake (106) may be utilized by the modeling system (108) and/or the analytics platform (109) to create a propensity model, apply a propensity model to business entity data, and/or score a business entity based on a propensity model application, without impacting the account data (105) of the production environment (104). For example, the data lake (106) may be utilized for running queries, performing feature engineering, and other data analytics operations. As an option, the data lake (106) may operate on a clustered computing environment, such as a Hadoop cluster.

In one or more embodiments, the analytics platform (109) includes any environment for performing computational and/or statistical analysis. As an option, the analytics platform (109) includes a massively parallel processing system. Accordingly, the analytics platform (109) may be employed to rapidly explore data stored in the data lake (106). For example, the analytics platform (109) may perform feature engineering or feature generation on contents of the data lake (106). As an option, the analytics platform (109) may include a commercial computing system, such as IBM Netezza or Hewlett-Packard Vertica.

In one or more embodiments, the modeling system (108) includes a computing system operable to generate a propensity model. In one or more embodiments, the modeling system (108) may utilize the data lake (106) and/or the analytics platform (109) to generate a propensity model. For example, the analytics platform (109) may, under the control of the modeling system (108), perform feature engineering to identify deterministic aspects of business entity data, and subsequently generate rules based on such features. Moreover, a propensity model may be built using the generated rules. For example, the rules may be included in a rule ensemble-type model.

Figure 1B:
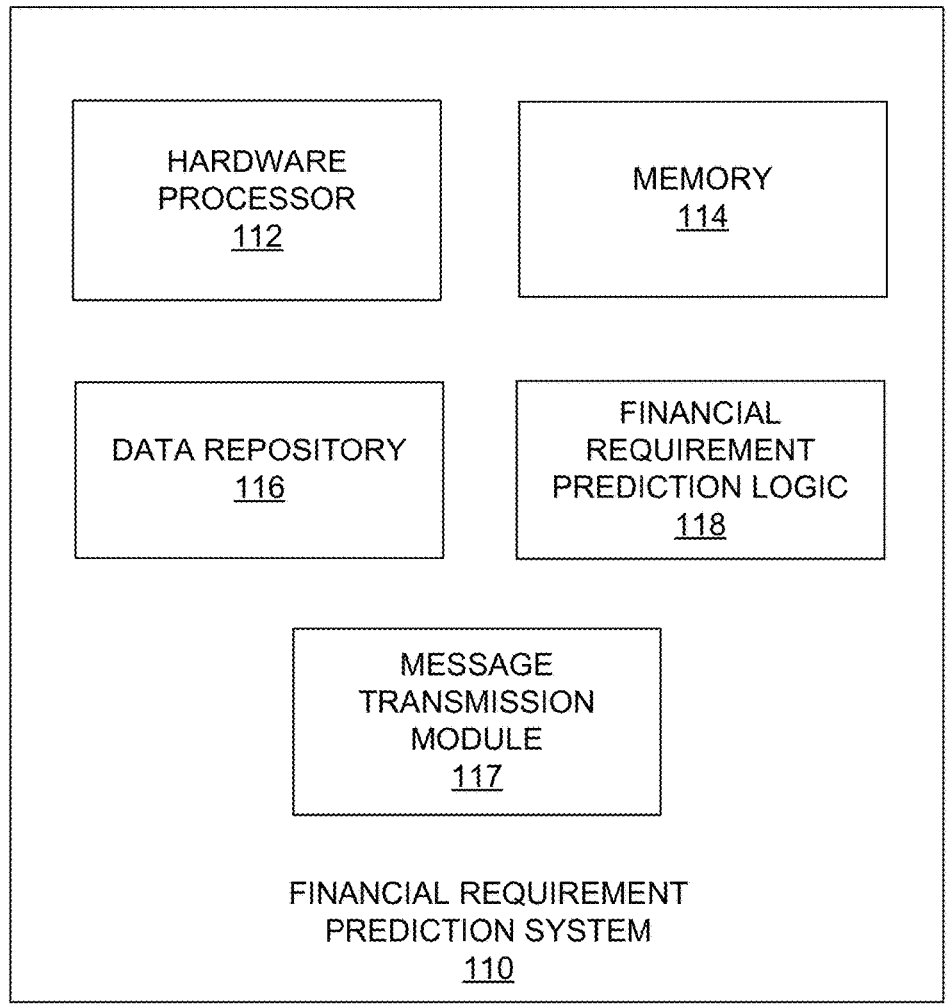

FIG. 1B shows a financial requirement prediction system (110) in accordance with one or more embodiments of the invention. The prediction system (110) is shown to include a hardware processor (112), memory (114), a data repository (116), financial requirement prediction logic (118), and a message transmission model (117), each of which are discussed in more detail below.

The financial requirement prediction logic (118) includes hardware and/or software for predicting a financial requirement of a business entity. As used herein, the "financial requirement" may include a future financial need of the business entity. As described in more detail below, the financial requirement may be identified using financial data associated with the business entity, in conjunction with metadata associated with the business entity. Moreover, a "business entity" includes any person or company that is engaged in a commercial enterprise. For example, in one or more embodiments, a business entity may include a physician practicing as a solo practitioner in the state of California. As another example, a business entity may include a bakery with a downtown storefront in Philadelphia, Pa., and which is incorporated in the state of Delaware. As described in more detail below, any interaction of an employee of the business entity with a financial management platform may be attributed to the business entity. For example, the creation of transaction records (e.g., sales records, purchase orders, etc.) by an employee of the bakery in Philadelphia may be attributed, within the financial management platform, to the bakery.

In one or more embodiments, business entity data may be stored in the data repository (116). As described in more detail below, the business entity data may include financial data and/or metadata associated with one or more business entities. In one or more embodiments, the business entity data in the data repository (116) may include the data of business for which a financial need will be determined.

For example, the data repository (116) may include numerous records, where each record is associated with a different business entity. Moreover, each record includes data of the corresponding business entity, where the included data matches the rules of a propensity model. In other words, only a portion of a given business entity's data stored in a production environment may be present in a record in the data repository (116). Also, the data repository (116) may store the data of only a subset of the business entities of a production environment. In this manner, some data (e.g., columns, etc.) associated with a given business entity that is not useful for predicting a financial need of the business entity may be excluded from storage at the data repository (116), and the data of some business entities may be altogether excluded from storage at the data repository (116).

In one or more embodiments, the data repository (116) is any type of storage unit and/or device (e.g., a file system, database, collection of tables, or any other storage mechanism) for storing data. Further, the data repository (116) may include multiple different storage units and/or devices. The multiple different storage units and/or devices may or may not be of the same type or located at the same physical site.

In one or more embodiments, the hardware processor (112) includes functionality to execute the financial requirement prediction logic (118). Moreover, the financial requirement prediction logic (118), or a copy thereof, may reside in the memory (114) during the execution. In one or more embodiments, financial requirement prediction system (110) may include hardware components (not shown) for enabling communication between the hardware processor (112), the memory (114), the data repository (116), the financial requirement prediction logic (118), and/or the message transmission module (117). For example, the prediction system (110) may include a system bus for communication between the hardware processor (112), the memory (114), the data repository (116), the financial requirement prediction logic (118), and/or the message transmission module (117).

Further, as described herein, the message transmission module (117) includes logic for providing a message to a business entity. In one or more embodiments, the message transmission module (117) may include software and/or hardware for initiating transmission, via a computer network, of an electronic message to a business entity. In such embodiments, the message may include an email, a web page, or an advertisement. In one or more embodiments, the message transmission module (117) may include software and/or hardware for initiating transmission, via physical correspondence, of a message to a business entity. In such embodiments, the message may include printed matter (e.g., a letter, postcard, flyer, etc.) or other promotional material that is delivered to a mailing address of a business entity. As an option, the message transmission module (117) may generate a list of business entities and/or messages. The list of business entities and/or messages may be used (e.g., by a third-party vendor) for sending the messages via physical correspondence to the business entities in the list.

In one or more embodiments, the message transmission module (117) may be pre-configured with policies. Moreover, based on the policies, the message transmission module (117) may determine whether a given business entity will receive an electronic message or physical correspondence. For example, the financial requirement prediction logic (118) may utilize a score of a business entity to classify a future financial requirement of the business entity, and the message transmission module (117) may then transmit a message to the business entity based on the classification of the future financial requirement.

Figure 1C:
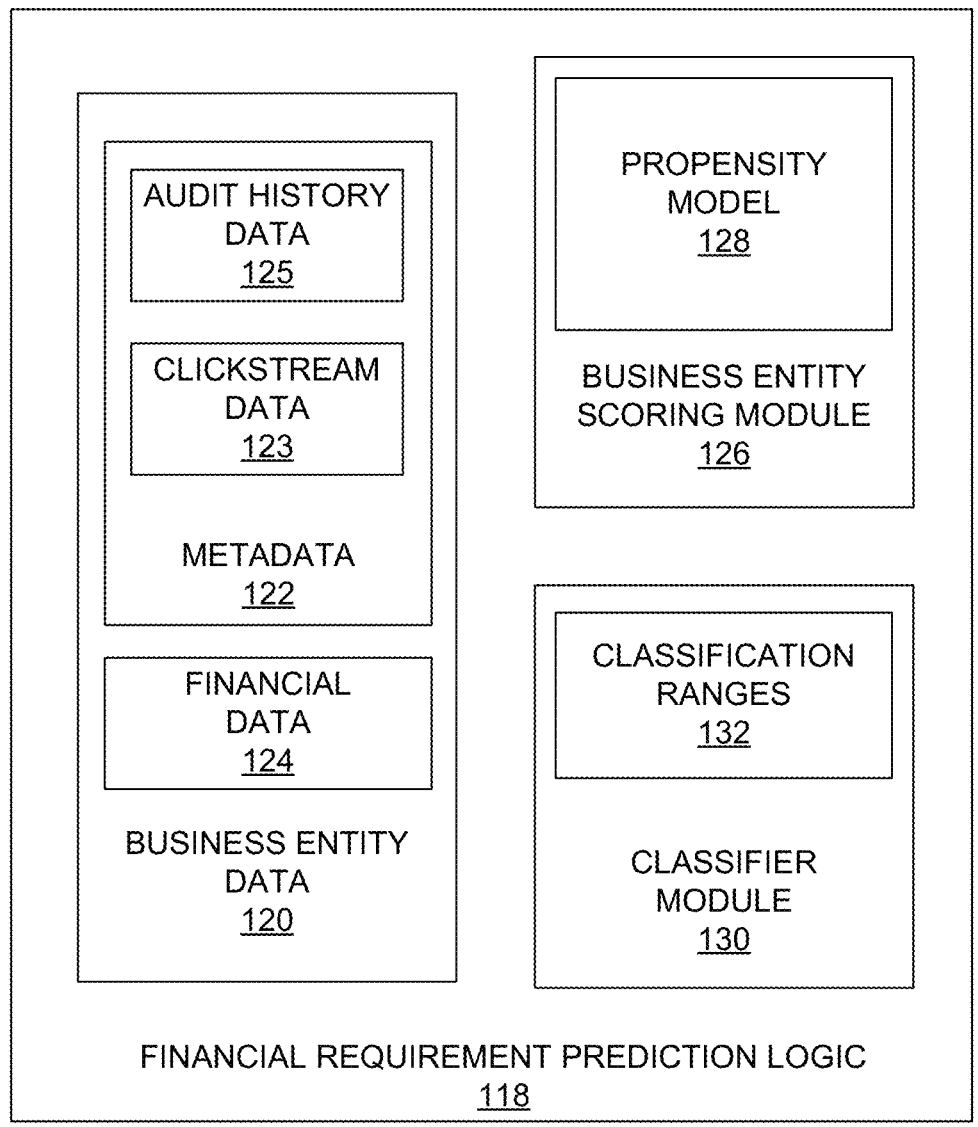

Referring now to FIG. 1C, the financial requirement prediction logic (118) includes business entity data (120), a business entity scoring module (126), and a classifier module (130). Further, the business entity data (120) is shown to include financial data (124) and metadata (122), where the metadata (122) is shown to include clickstream data (123) and audit history data (125). Also, the business entity scoring module (126) is shown to include a propensity model (128). The classifier module (130) is shown to include classification ranges (132). Each component of the financial requirement prediction logic (118) is discussed in more detail, below.

In one or more embodiments, the business entity data (120) includes the data of a business entity. More specifically, the business entity data (120) includes financial data (124) and metadata (122) of a given business entity.

In one or more embodiments, the financial data (124) of a business entity includes any economic data associated with, generated by, or generated on behalf of, the business entity during the course of its commercial operations. As an option, the financial data (124) may include cash flow or transaction information. Transaction information of a business entity may include one or more of invoice information of the business entity, deposit information of the business entity, and expense information of the business entity.

More specific examples of transaction information include a number of invoices issued by the business entity for a time period, a total value of the invoices for a time period, and/or an average value of the invoices for a time period, etc. Also, as an option, the transaction information may include a value of outstanding invoices due to be paid to the business entity, a number of outstanding invoices due to the business entity, and a spread of the outstanding invoices among customers of the business entity. Further, the transaction information may include a value of payments received by the business entity, a number of bank deposits performed by the business entity, a total value of deposits for a time period, and/or an average value of deposits for a time period, etc. Still yet, the transaction information may include the value of outstanding bills the business entity is due to pay, a number of expenses of the business entity for a time period, a total value of the expenses for a time period, a relative amount of expenses to invoices, and/or an average value of the expenses for a time period, etc.

Also, the financial data (124) of a business entity may include, for example: a net worth of the business entity; a tangible net worth of the business entity; a net margin of the business entity; an annual sales revenue of the business entity; a monthly average of the credits of the business entity; a number of days turnover of accounts receivable for the business entity; sales growth of the business entity; earnings of the business entity before interest, taxes, depreciation, and amortization; and transaction information of the business entity.

As an option, the financial data (124) may include week-over-week, month-over-month, year-over-year, etc. trends of any of the above information, expressed as a dollar value or a percentage.

In one or more embodiments, the metadata (122) includes any non-economic information maintained about a given business entity. The metadata (122) of a business entity may be recorded by a platform as users associated with the business entity interact with the platform. In one or more embodiments, the metadata (122) includes both audit history data (125) and clickstream data (123).

In one or more embodiments, the audit history data (125) includes a record of discrete actions, previously performed on a platform, by the users associated with a business entity, where the performed actions document the commercial activities and/or financial reporting activities of the business entity. In other words, the audit history data (125) includes a record of who has done what, on a platform, on behalf of a business entity. In one or more embodiments, the clickstream data (123) includes a record of actions, performed on the platform, of the users associated with the business entity, where the performed actions reflect user preferences, habits, tendencies, and/or patterns of use of the platform, and where such actions do not directly affect the commercial activities of the business entity. Thus, neither the audit history data (125) nor the clickstream data (123) may be considered user-entered data. Because the metadata (122) is not user-entered, it is not as susceptible to human error or manipulation as the financial data (124), and therefore may be more robust than the financial data (124).

For example, while a user associated with a business entity may erroneously enter transaction data, such as, for example, by entering the wrong value (e.g., "$525.00" vs. "$52,500"), or intentionally manipulate such values for purposes of misrepresentation, the metadata (122) reflecting time, date, originating location, etc. of user activity, as well as usage habits and preferences, is less likely to be affected by such artifacts.

As an option, the audit history data (125) may include platform accesses or logins, transaction record creation activities, transaction record modification activities, transaction record closing activities, personnel management activities, observed bookkeeping practices of the business entity, and/or the addition or removal of attachments to the platform.

For example, the audit history data (125) may include an entry for each access or login, by a user associated with a given business entity, to a platform to manage or view the business entity's data. The time and date of each access or login to the platform may be recorded, such that the audit history data (125) includes a timestamp for each of the accesses of the platform by the one or more users associated with the business entity, as well as a location (e.g., IP address, city, state, country, etc.) from which the login originated. As a more specific example, the audit history data (125) for a given business entity may include entries indicating that the owner of the business entity has logged-in to a platform twice in May 2016—once on May 2, 2016 at 2:15 PM from Texas, and once on May 28, 2016 at 8:15 PM from Maine.

Accordingly, using the audit history data (125), a frequency of logins/access for a given user or business entity may be determined (e.g., a number of times a week, month, quarter, etc.), as well as the last time any user, or a specific user, of the business entity accessed a financial management platform for managing the commercial activities of a business entity.

As another example, the audit history data (125) may include a record of who has created each invoice, the amount of the invoice, the terms of the invoice, and when it was created. Also, the audit history data (125) may include a record of any invoice modifications, or invoice closings, as well as when the invoices were modified or closed.

Because the audit history data (125) may include when users associated with a business entity update transaction records (e.g., time of a day), a frequency with which the users associated with the business entity update transaction records, and/or locations from which the users associated with the business entity update transaction records, the audit history data (125) may provide accurate insight into the bookkeeping practices of the business entity.

As yet another example, the personnel management activities in the audit history data (125) may identify the hiring or termination of employees, their names, titles within the business entity, and their usage roles on a platform used by the business entity. This data may be used to identify and quantify the growth of a company (e.g., five new employees added in the last year, etc.), and the growth of a department of a company (e.g., five new salespeople, cashiers, managers, etc. added in the last year).

As yet another example, the audit history data (125) may identify the addition or removal of attachments to a platform. In one or more embodiments, an attachment comprises any application or software package that provides add-on functionality to the platform, modifies the platform, and/or customizes the platform for the business entity. Accordingly, the attachment may enable the business entity to perform some business function not previously possible without the addition of the attachment, or enable the business entity to perform a business function in a more efficient manner. The attachment may be developed by a third-party that is not responsible for building or maintaining the platform, or may be developed and offered by the entity responsible for building and maintaining the platform. As specific examples, an attachment may provide for inventory management functionality, payroll functionality, credit card processing functionality, customized reporting, etc., that is not otherwise included with the platform. A business entity may pay for the additional functionality of such attachments.

Records in the audit history data (125) reflecting the addition or removal of attachments to a platform may be utilized to identify business growth, milestones, etc., or patterns thereof. Accordingly, the addition of an attachment may affect a propensity model score of a business entity. For example, a score of a business entity that is generated by applying a propensity model (128) to the financial data (124) and the metadata (122) of the business entity may increase or decrease after the business entity purchases a credit card processing attachment. In such an example, the score of the business entity may further increase or decrease if the sales of the business entity increase (i.e., as evidenced in the financial data (124) of the business entity), as a function of the business entity's added credit card processing capabilities. Similarly, a score of a business entity that is generated by applying a propensity model (128) to the financial data (124) and the metadata (122) of the business entity may increase or decrease after the business entity purchases an inventory management attachment. In such an example, the score of the business entity may further increase or decrease if the business entity immediately integrates the inventory management attachment in a manner that evidences a growing inventory. As yet another example, a score of a business entity that is generated by applying a propensity model (128) to the financial data (124) and the metadata (122) of the business entity may increase or decrease after the business entity purchases a payroll attachment. In such an example, the score of the business entity may further increase or decrease if the business entity adds one or more employees to payroll immediately after purchasing the payroll attachment.

Any information obtained from the records in the audit history data (125) may be combined with information obtained from the financial data (124) to increase the accuracy of the scoring performed by a propensity model (128), as described in more detail below. In other words, the audit history data (125) may be used to augment a financial data-based propensity model. For example, for two business entities having substantially identical financial data (124), but one of the business entities has an accountant maintaining the books of the business entity on a regular weekly basis, and the other has its owner updating transactions once every month, the two business entities may be scored differently by the same propensity model (128) based upon differences in audit history data (125). Even more, increasing or decreasing trends in the transaction maintenance practices of the accountant may have a different effect on a propensity model score than the same increasing or decreasing trends in the transaction maintenance practices of the business owner.

In one or more embodiments, the clickstream data (123) includes the occurrences, time spent, and/or frequency with which particular activities are performed on a platform. Such activities may include viewing one or more portions of the platform, interacting with one or more portions of the platform, generating one or more reports, viewing one or more reports, navigating between portions or reports, etc.

As an option, a platform may be divided into various different portions. As used herein, each portion of the platform may include various tools and/or interfaces associated with a single purpose. For example, a given platform for managing a business may include a first portion that provides a dashboard of company health information; a second portion that provides interfaces or tools for managing, contacting, and adding customers; a third portion that provides interfaces or tools for managing transactions; a fourth portion that provides interfaces or tools for generating, executing, and customizing reports; and a fifth portion that provides interfaces or tools for managing employees, etc.

The clickstream data (123) may provide insight into the behavior of users associated with a business entity. The clickstream data (123) may be used to establish behavioral baselines, and to identify deviations from such baselines. Moreover, the identification of deviations from such baselines may be utilized for augmenting a financial data-based identification of a future financial requirement or need of a business entity. For example, one behavioral pattern identifiable in the clickstream data (123) for a business entity, and which may affect a propensity model score of the business entity, includes a user viewing, with increasing frequency, payroll and cash flow reports. Another behavioral pattern identifiable in the clickstream data (123) for a business entity, and which may affect a propensity model score of the business entity, includes a user viewing, with increasing frequency, a cash balance of the business entity.

Other specific examples of records that may be included in the clickstream data (123) include the time taken by a user to enter invoices, close invoices, etc., as well as the time between tasks (e.g., between entering two invoices, between entering an expense and performing a subsequent task, etc.). Additionally, the clickstream data (123) may include observed click paths of a user. For example, the clickstream data (123) may include the navigational path utilized by a user for arriving at a payroll portion of a platform, for viewing vendor information, for viewing recent deposits, etc.

Thus, used separately, or in combination, the audit history data (125) and the clickstream data (123) may be used to set a baseline of activity for users associated with a business entity. As illustrated below, as user activity changes over time, such changes in activity may be used to augment a financial data-based determination regarding a future financial requirement of the business entity.

In addition to the audit history data (125) and the clickstream data (123) described above, the metadata (122) may include, for example: a number of inventory items recorded in a financial management platform; a version of a financial management platform utilized by a business entity (e.g., an older version of the platform instead of upgrading to a newer version); a duration of time that the business entity has utilized the financial management platform; a geographic location of operation of the business entity; a business classification of the business entity; an age of the business entity; demographics of the customers of the business entity; a general climate of the business entity's commercial practices; an overall climate of a localized, regional, national, or global economy; economic trends; the tax form(s) utilized by the business entity to report income to a government; opinions and reviews of the business entity as determined from social networks; and a number of packages being regularly shipped (e.g., per day, week, month, etc.) by the business entity.

In one or more embodiments, the duration of time that the business entity has utilized the financial management platform may be calculated utilizing a first charge date. A first charge date includes a past point in time that is identified as the beginning of a business relationship between the business entity and the financial management platform (i.e., the beginning date of a subscription to the financial management platform, etc.). As an option, the first charge date may be represented as calendar date (e.g., Jan. 3, 2013, May 10, 2011, etc.); or as a measurable quantity of time periods between the first charge date and a given date (e.g., 8 weeks, 56 days, 2 months, 0.154 years, etc.). The given date may be a current date, a date that has already passed, or a date in the future.

As an option, the age of the business entity may be determined based on input from a user associated with the business entity. For example, the user may specify that the business was started in 1990, or has been doing business for 26 years. As another option, the age of the business entity may be determined from a third-party source. For example, a year of incorporation of the business entity, or other starting date, may be obtained from public records (e.g., Secretary of State, Division of Corporations, etc.), or from a private entity, such as Dun & Bradstreet.

A rule directed to a geographic location of operation of the business entity may include a condition regarding a country of operation (e.g., United States of America, Canada, etc.), a region of operation (e.g., Pacific Northwest, etc.), a state of operation (e.g., California, Illinois, Arkansas, etc.), a city of operation of the business entity. Also, a rule directed to a business classification of the business entity may rely on a standardized classification system, such as, for example, North American Industry Classification System (NAICS).

The financial data (124) and the metadata (122) of a given business entity may be utilized as input to the propensity model (128) for determining a future financial requirement of the business entity, as described in more detail below.

In one or more embodiments, the propensity model (128) may be generated by the modeling system (108) shown in FIG. 1A using the analytics platform (109) and/or the data lake (106). Accordingly, the modeling system (108) may generate the propensity model (128) using the account data (105), or a subset thereof, that originates from the production environment (104).

In one or more embodiments, the business entity scoring module (126) applies the propensity model (128) to the business entity data (120) to generate a score for a business entity. In one or more embodiments, the propensity model (128) may include a plurality of different rules. Accordingly, applying the propensity model (128) to the business entity data (120) may include testing or comparing the business entity data (120) against the rules of the propensity model (128).

For example, by applying the propensity model (128) to the data (120) of a business entity, one or more aspects of the financial data (124) and the metadata (122) may be compared to rules regarding financial data and metadata. Additionally, for any of the various types of the metadata (122), changes over a period of time may be observed and utilized within the propensity model (128) for scoring the business entity. For example, due to rules of the propensity model (128), a business entity that has been shipping an increasing number of packages month-over-month may score more highly than a business that has been consistently shipping the same number of packages month-over-month.

As an option, a rule in the propensity model (128) may combine one or more aspects of the financial data (124) with one or more aspects of the audit history data (125) and/or the clickstream data (123). For example, a given rule may include a condition regarding sales data of the business entity, as well as a condition regarding a platform access trend of the business entity and/or a pattern of report generation of users associated with the business entity. These aspects, when combined, may be used to predict not only the growth of the business entity, but the growth of the business entity beyond its current financial means. For example, an increasing trend of platform accesses, combined with an increasing frequency of payroll and/or cash flow report generation, increasing week-over-week or month-over-month sales, and a relatively recent first charge date, may, all-together, indicate a young and successful, but cash-strapped business, where the future financial requirement of the business has not yet been perceived by its owner.

In one or more embodiments, each of the rules in the propensity model (128) may be associated with a support value, a coefficient, and/or an importance value. The support value of a rule may indicate a fraction of time for which the condition of the rule was true, based on the data that was used to build the propensity model (128). For example, for a rule with the conditions of "STATE==CA & OUTSANDING_INVOICES>=17," and a support value of 0.643, the support value would indicate that of the business entities whose data was used to build the propensity model (128), approximately 64.3% of those business entities were located in California and had at least 17 outstanding invoices. Additionally, the coefficient of a rule may indicate an impact the rule has on the outcome, where an absolute value of the coefficient indicates a weight (i.e., less likely to need financing). Accordingly, a larger coefficient may result in a greater impact on a final score. As an option, each coefficient may be either positive or negative. Thus, the sign of a given coefficient may indicate whether the coefficient impacts a final score in an increasing or decreasing manner (i.e., increases or decreases the final score when the associated rule is determined to be true).

Still yet, the importance value of a rule may be a global measure reflecting an average influence of a predictor over the distribution of all joint input variable values. In one or more embodiments, the rules of the propensity model (128) may be ranked based on the corresponding importance values of each of the rules.

In one or more embodiments, the propensity model (128) may be expressed as a mathematical formula, such that the application of the propensity model (128) to the business entity data (120) includes calculating a score for the business entity according to the mathematical formula. For example, application of the propensity model (128) to the business entity data (120) may include determining, for each rule in the propensity model (128), whether or not the rule is true when applied to the data (120) of the business entity. If the rule is true, then a pre-determined value may be multiplied by the coefficient associated with the rule to generate a result. This may be repeated for each of the rules in the propensity model (128) utilizing the business entity data (120) to generate a plurality of results. Moreover, each of the results may be summed to calculate a score of the business entity. As an option, the summation of the results may be adjusted or normalized to calculate the score of the business entity.

For example, if a given propensity model (128) includes two rules, then business entity data (120) may be gathered such that the business entity data (120) matches the two rules. Further, the business entity scoring module (126) may score the business entity by, for each rule in the propensity model (128), determining whether the rule, as applied to the data (120) of the business entity, evaluates as true or false. For each of the rules that evaluates as true, a coefficient associated with that rule is multiplied by a value of '1,' and for each of the rules that evaluates as false, the coefficient associated with that rule is multiplied by a value of '0.' Moreover, the products may be summed. Thus, if a first rule in the propensity model (128) is associated with a coefficient of 0.880, and a second rule in the propensity model (128) is associated with a coefficient of −0.349, then a score of 0.531 may be calculated for the business entity when both rules evaluate as true (i.e., (1*0.880)+(1*−0.349)=0.531).

In one or more embodiments, a given propensity model (128) may be utilized to score numerous business entities. For example, the business entities may be scored in parallel, as a batch, etc.

In one or more embodiments, the classifier module (130) includes hardware and/or software for segmenting business entities based on the scores attributed to the business entities by the business entity scoring module (126). In one or more embodiments, the classifier module (130) may classify the business entities using the classification ranges (132). As an option, the classification ranges (132) may include one or more pre-determined ranges of values, where each of the ranges is associated with a discretized level of financial need.

For example, business entities may be classified by dividing up the business entities into four quartiles. Those business entities classified in the highest 25% of scores may have the greatest likelihood of needing a financial infusion or loan product, which may be used to help the business grow. Conversely, those business entities classified in the lowest 25% of scores may be identified as having the lowest likelihood of needing a financial infusion or loan product. As an option, by classifying the business entities, those with the greatest future financial requirement may be rapidly identified and offered a loan product.

While FIGS. 1A, 1B, and 1C show one possible configuration of components, other configurations may be used without departing from the scope of the invention. For example, various components may be combined to create a single component. As another example, the functionality performed by a single component may be performed by two or more components.

Figure 2A:
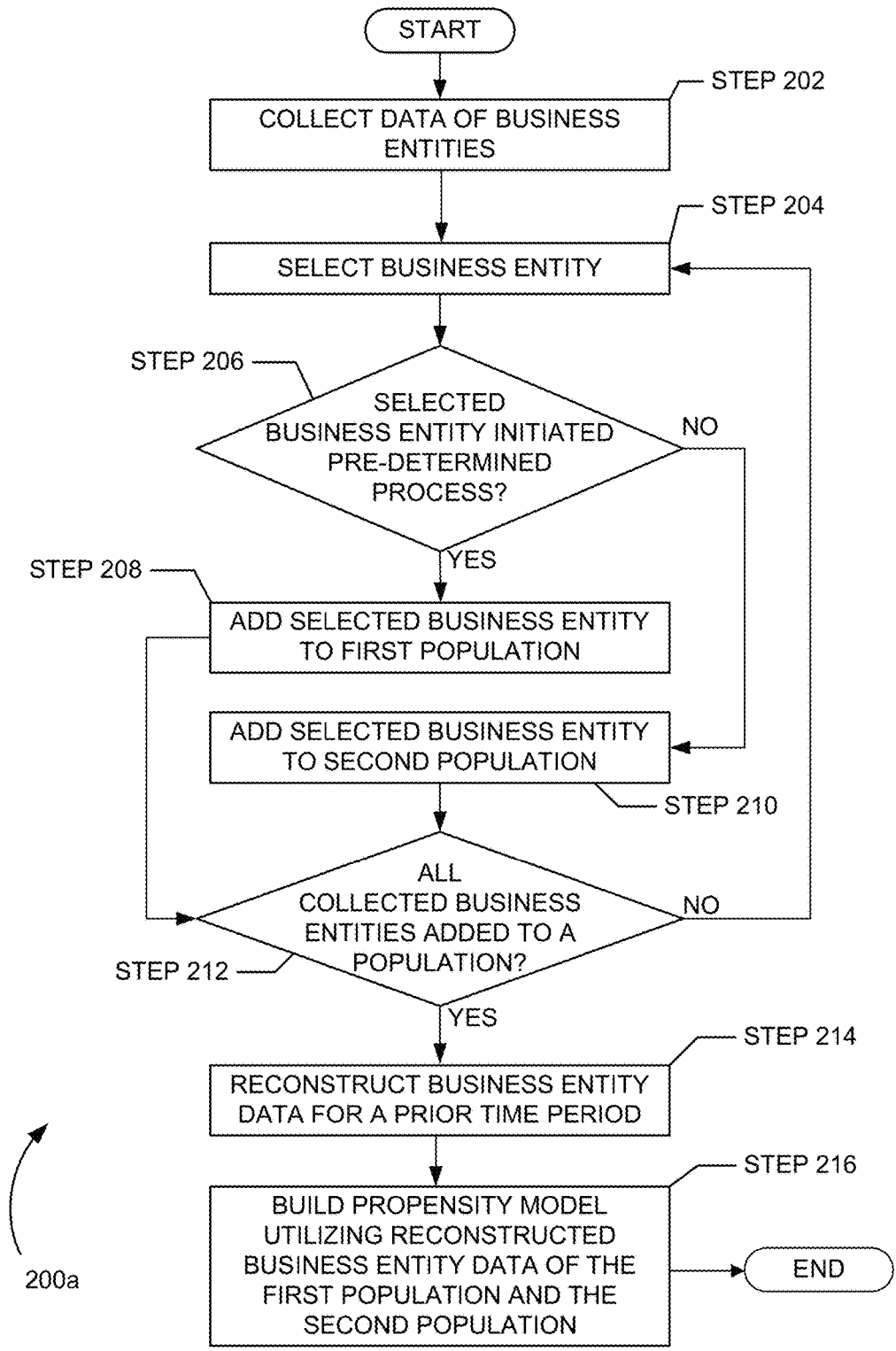
FIGS. 2A and 2B illustrate methods performed in accordance with one or more embodiments of the invention.

FIG. 2A depicts a flowchart of a method (200a) of generating a propensity model to determine a future financial requirement, in accordance with one or more embodiments of the invention. In one or more embodiments, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method (200a) described in reference to FIG. 2A may be practiced using the system (100) described in reference to FIG. 1A and the system (110) described in reference to FIGS. 1B and 1C, above, and/or involving the computing system (500) described in reference to FIG. 5A.

At Step 202, data of numerous business entities is collected. In one or more embodiments, the data of the business entities includes metadata, such as audit history data and clickstream data of the business entities, as well as financial data of the business entities. For example, the data may include platform accesses or logins, transaction record creation activities, transaction record update activities, personnel management activities, time spent viewing one or more portions of a platform, report generation activities, outstanding amounts due, and/or payroll information. Moreover, collecting the data may include any acquisition of the data. For example, the data may be retrieved from a production environment (104) or data lake (106), as described in the context of FIG. 1A.

In one or more embodiments, each of the business entities for which data is collected at Step 202 may have previously received an actionable offer. Moreover, the previously received actionable offers may include financial offers. For example, the actionable offers may have included offers for loans, such as business loans. Accordingly, each of the business entities for which data is collected may have previously received offers for business loans. Moreover, each of the offers for business loans may have been tailored for the business entity by which it was received. As an option, the actionable offers may have been provided to the business entities by physical correspondence (e.g., a mailed letter, postcard, etc.), by electronic correspondence (e.g., email, instant message, etc.), or as a targeted advertisement (e.g., advertisement in a webpage, etc.).

A first one of the business entities is selected at Step 204. Next, at Step 206, it is determined whether the selected business entity initiated a pre-determined process. In one or more embodiments, the pre-determined process may include any action taken in response an actionable offer. For example, the pre-determined process may include activating a link in response to the actionable offer, filling out a form in response to the actionable offer, calling a phone number in response to the actionable offer, submitting a loan application in response to the actionable offer, calling a loan officer in response to the actionable offer, and/or visiting a website in response to the actionable offer. In other words, where the actionable offer includes an offer for a loan, then the pre-determined process may include an event that indicates the business entity showed interest in the loan.

If, at Step 206, it is determined that the selected business entity initiated the pre-determined process, then the selected business entity is added, at Step 208, to a first population of business entities. However, if, at Step 206, it is determined that the selected business entity did not initiate the pre-determined process, then the selected business entity is added, at step 210, to a second population of business entities. In one or more embodiments, the selected business entity may be added to a population by setting a flag associated with the business entity. For example, a first flag (i.e., a bit '1', etc.) may be associated with the selected business entity if it initiated the pre-determined process, and a second flag (i.e., a bit '0', etc.) may be associated with the selected business entity if it did not initiate the pre-determined process.

Moreover, at Step 212, it is determined whether all business entities for which data has been collected have been added to the first population or the second population. If there are unclassified business entities remaining, such that at least one business entity has not been placed into the first population or the second population, then the method (200a) returns to Step 204, where a next business entity is selected. Further, the next business entity is classified as belonging to the first population or the second population according to Steps 206-210, as described above. In one or more embodiments, the classification of the business entities into the first and second populations may occur in a parallel manner, such that multiple business entities are simultaneously added to the two populations.

Accordingly, the classification of the business entities, for which data was collected at Step 202, continues until all of the business entities have been added to either the first population or the second population. Moreover, when it is determined, at Step 212, that all of the business entities have been added to one of the two populations, then the instances of business entity data are reconstructed, at Step 214. Moreover, the reconstruction of the business entity data is performed such that the reconstructed business entity data is representative of a prior time period.

In one or more embodiments, the audit history data of a business entity may be used to reconstruct other data of the business entity. The audit history data of a business entity may serve as a transaction log of the business entity. For a given business entity, the audit history data of the business entity may include a record (e.g., a line, a row, etc.) that indicates an action taken on behalf of the business entity, as well as a timestamp for the action. The timestamp may include a date and/or time the action was performed. Moreover, the action taken on behalf of the business entity may include any action performed by the business entity, or a user associated with the business entity, within a production environment, such as the production environment (104) of FIG. 1A. For example, the business entity may include various user accounts (e.g., an accountant, a manager, a cashier, etc.) that are associated with the business entity. The various users may access a financial management platform hosted within a production environment. Within the financial management platform, the users may generate transaction data by creating invoices, making sales, applying payments to accounts, or performing other business transactions that impact the financial data of the business entity. A record of each transaction may be kept in the audit history data of the business entity.

Accordingly, during a reconstruction of the data of the business entity, one or more transactions may be removed to generate reconstructed data for the business entity. In one or more embodiments, the removed transactions may include all transactions that occurred after a specified date. In other words, the reconstructed data of a business entity may include only transactions that were performed on behalf of the business entity on or prior to a particular date. Also, during the reconstruction of the data of the business entity, records in the audit history data and/or clickstream data of the business entity may be removed to generate the reconstructed data for the business entity. Again, the records removed from the audit history data and/or clickstream data may include the records for all activities (e.g., logins, attachment purchases, etc.) that occurred after the specified date. In this way, the reconstructed data of the business entity may include only the tracked actions of users that happened on or prior to the particular date.

As an option, the particular date may be a pre-determined time period prior to receipt, by the business entity, of an actionable offer. In other words, the particular date used to generate reconstructed data for a business entity may be a number of days, weeks, months, or years prior to when the business entity received an actionable offer.

For example, for a given business entity that receives an actionable offer for a business loan, all transactions that occurred, as well as audit history data and clickstream data recorded, subsequent to three months before the day the offer was received, may be removed from the data of the business entity to generate the reconstructed business entity data. In this way a snapshot of the business entity may be created that represents a state of the business entity before it was offered a loan. Moreover, at Step 214, such snapshots may be created for all business entities in the first population and the second population. In this way, different business entities may receive offers for loans on different dates, and the business entity snapshots consistently represent the respective states of the different business entities at corresponding earlier dates.

Next, at Step 216, a propensity model is built utilizing the reconstructed business entity data of the business entities in the first population and the second population. In one or more embodiments, the propensity model is built using machine learning, such as, for example, by applying a rule ensemble method to the reconstructed data of the business entities. For example, building the propensity model may include generating different rules, testing the rules against the reconstructed business entity data, and then ranking the different rules. Each of the rules may include one or more conditions. As an option, the ranks assigned to the rules may be determined by logistic regression. Also, a given propensity model may be configured to include tens, hundreds, or thousands of rules.

In one or more embodiments, after building the propensity model, the rules of the propensity model may be modified. As an option, the rules may be modified manually, by a data scientist or engineer. A rule may be modified by altering its coefficient, by deleting a rule, by changing conditional values, etc. For example, using the example described above, where the rule includes a condition of "OUTSTANDING_INVOICES>=17," the condition of the rule may be modified to require "OUTSTANDING_INVOICES>=19." In this way, the strength of the propensity model may be iteratively tested and improved.

Because the propensity model is built utilizing the reconstructed data of the two populations, the propensity model may serve to identify differences that differentiate the data of the business entities that initiated a pre-determined process from the business entities that did not initiate the pre-determined process. Moreover, because the propensity model is built utilizing the audit history data and clickstream data of the two populations, correlations between user behavior and financial trends of the business entities may be identified and leveraged for inclusion in the propensity model.

After the propensity model has been built, it may be tested using testing data. In particular, the testing data may include data for numerous business entities that previously received actionable offers. Moreover, for each of the business entities included in the testing data, the outcome of whether the business entity initiated the pre-determined process, in response to the actionable offer, may be known. For example, the testing data may include a plurality of business entities that received offers for business loans, and, for each of the business entities in the testing data, it is known whether or not that business entity initiated a business loan process in response to the offer.

Figure 2B:
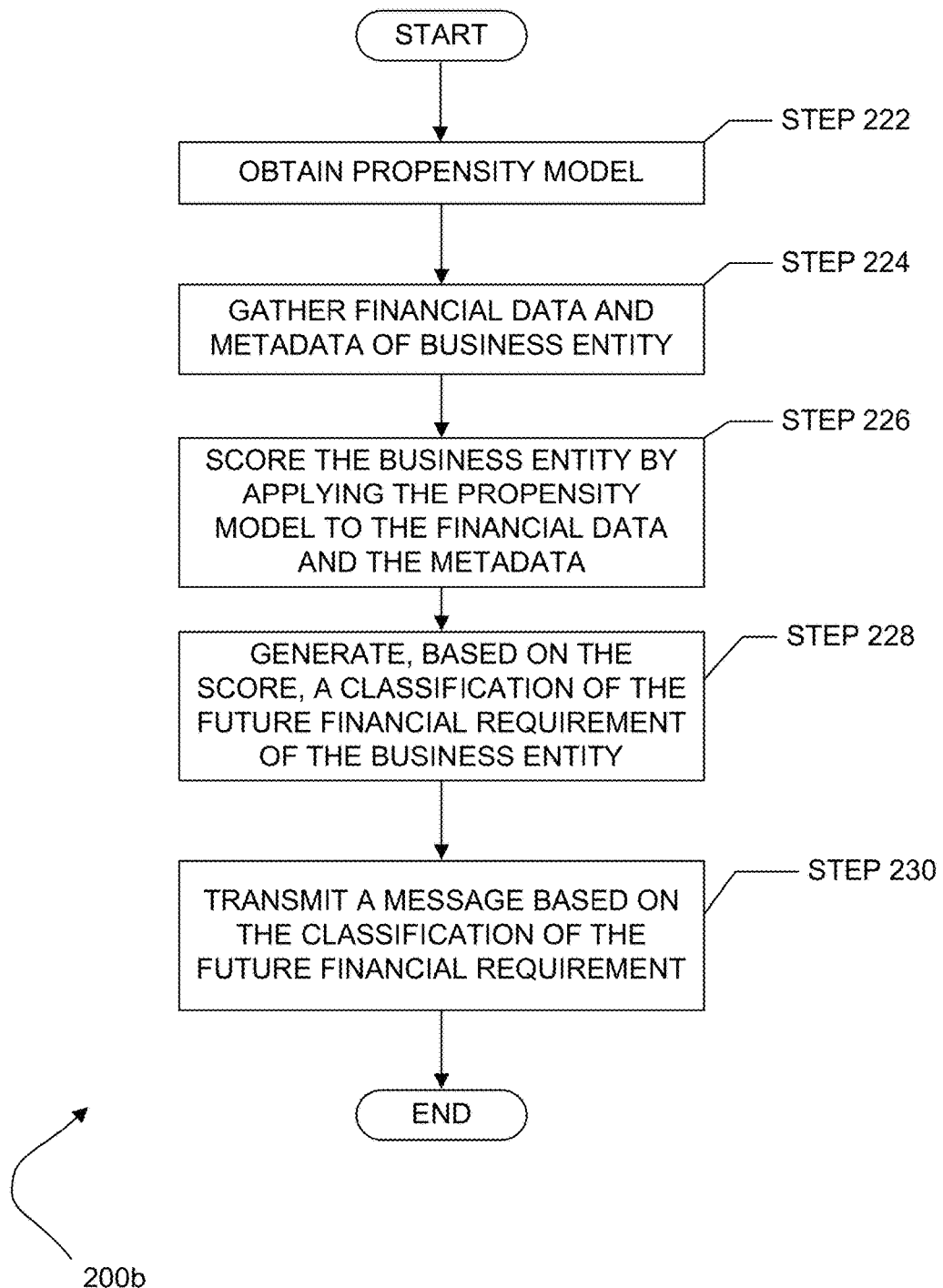

FIG. 2B depicts a flowchart of a method (200b) of utilizing a propensity model to determine a future financial requirement, in accordance with one or more embodiments of the invention. In one or more embodiments, one or more of the steps shown in FIG. 2A may be omitted, repeated, and/or performed in a different order. Accordingly, embodiments of the invention should not be considered limited to the specific arrangements of steps shown in FIG. 2B. In one or more embodiments, the method (200b) described in reference to FIG. 2B may be practiced using the system (100) described in reference to FIG. 1A and the system (110) described in reference to FIGS. 1B and 1C, above, and/or involving the computing system (500) described in reference to FIG. 5A A propensity model is obtained at Step 222. Moreover, the propensity model models how data of a business entity relates to a future financial requirement of the business entity. For example, the propensity model may utilize a snapshot of a business entity at a current or prior time to determine that the business entity is likely to require a loan at some future point in time (e.g., in 3 months, 6 months, etc.). In one or more embodiments, the propensity model may include a propensity model that has been generated according to the method (200a) of FIG. 2A, described above. Of course, the propensity model obtained at Step 202 may be generated by any other relevant method.

Next, at Step 224, data of a business entity is gathered. As described herein, the data of the business entity may be created based on a platform utilized by the business entity. In one or more embodiments, the platform may include a financial management platform that the business entity utilizes in furtherance of one or more business objectives. For example, a financial management platform may be utilized for invoicing, billing, payroll, accounts receivable, and/or tracking stock, etc.

The gathered data of the business entity includes financial data of the business entity, as well as metadata describing use of the platform by one or more users associated with the business entity. For example, the gathered data may include audit history data and/or clickstream data of the business entity. The data of the business entity matches at least a subset of the propensity model. For example, if the propensity model includes a plurality of rules, where one of the rules is based on a platform login trend and a report generation trend of users associated with the business entity, then the data gathered at Step 224 will include both records of the platform logins by users associated with the business entity, and records of reports generated using the platform by the users associated with the business entity. As more specific examples, the records may include a calculated week-over-week increase in logins by the users, and a calculated week-over-week increase in payroll report generation by the users.

As used herein, gathering the data of the business entity includes any process that retrieves or receives the data of the business data. For example, the data of the business entity may be retrieved over a computer network, such as the Internet. In one or more embodiments, the data of the business entity may be gathered from a data lake, such as the data lake (106) described in the context of the system (100) of FIG. 1A, or directly from a repository of user data, such as the account data (105) of the production environment (104) described in the context of the system (100) of FIG. 1A. Of course, however, the data of the business entity may be gathered from any relevant source.

Next, at Step 226, the business entity is scored by applying the propensity model to the data of the business entity. In one or more embodiments, the propensity model includes numerous rules. Moreover, the rules of the propensity model may be based on financial and non-financial aspects of the business entities. As an option, the propensity model may be expressed as a mathematical formula, such that the application of the propensity model to the data of a business entity includes calculating a plurality of values and summing the values. For example, each rule of the propensity model may be associated with a coefficient, each of the coefficients may be multiplied by a '0' or a '1' based on the data of the business entity, and the products may be summed. Also, the sum may be normalized or adjusted. For example, the sum may be adjusted so that it is between 0 and 1, or another pre-determined range.

Also, a classification of a future financial requirement of the business entity is generated, at Step 228, based on the score of the business entity. In one or more embodiments, for each of the business entities scored by applying the propensity model to the data of the business entity, the business entity is classified based on its score.

For example, the business entities may be classified by dividing up the business entities into four quartiles. Those business entities classified in the highest 25% of scores may have the greatest likelihood of needing a loan. Conversely, those business entities classified in the lowest 25% of scores may be identified as having the least likelihood of needing a loan.

Still yet, at Step 230, a message is transmitted to the business entity. As described herein above, the message may include an email, a web page, or an advertisement. Accordingly, the transmission of the message includes any process of sending the message to the business entity in a targeted manner. As previously noted, the transmission may occur via a computer network and/or via physical correspondence.

In one or more embodiments a content of the message is based on the classification of the future financial requirement of the business entity. In other words, if the business entities are classified into quartiles based on their scores, then all business entities in the top quartile may be transmitted messages for the same, or a similar, offer. For example, all business entities classified in the top quartile may be offered business loans with interest rates between 3-7%. Similarly, all business entities classified in the second quartile may be offered business loans with interest rates between 5-9%.

Further, in one or more embodiments, the method of transmission is based on the classification of the future financial requirement of the business entity. For example, the messages transmitted to all business entities classified in the top quartile may be electronic messages (e.g., web page advertisements, emails, etc.), while the messages transmitted to all business entities classified in any of the other three quarters may be physical correspondence (e.g., postcards, direct mailings, etc.).

In this way, the business entities that are transmitted a message may be prioritized based on classification. This may ensure that those business entities determined to have the greatest financial need are contacted such that they can obtain the necessary financing in an efficient and timely manner, without risk of being forced into a high interest rate loan, or stunting the growth of their business.

Figure 3:
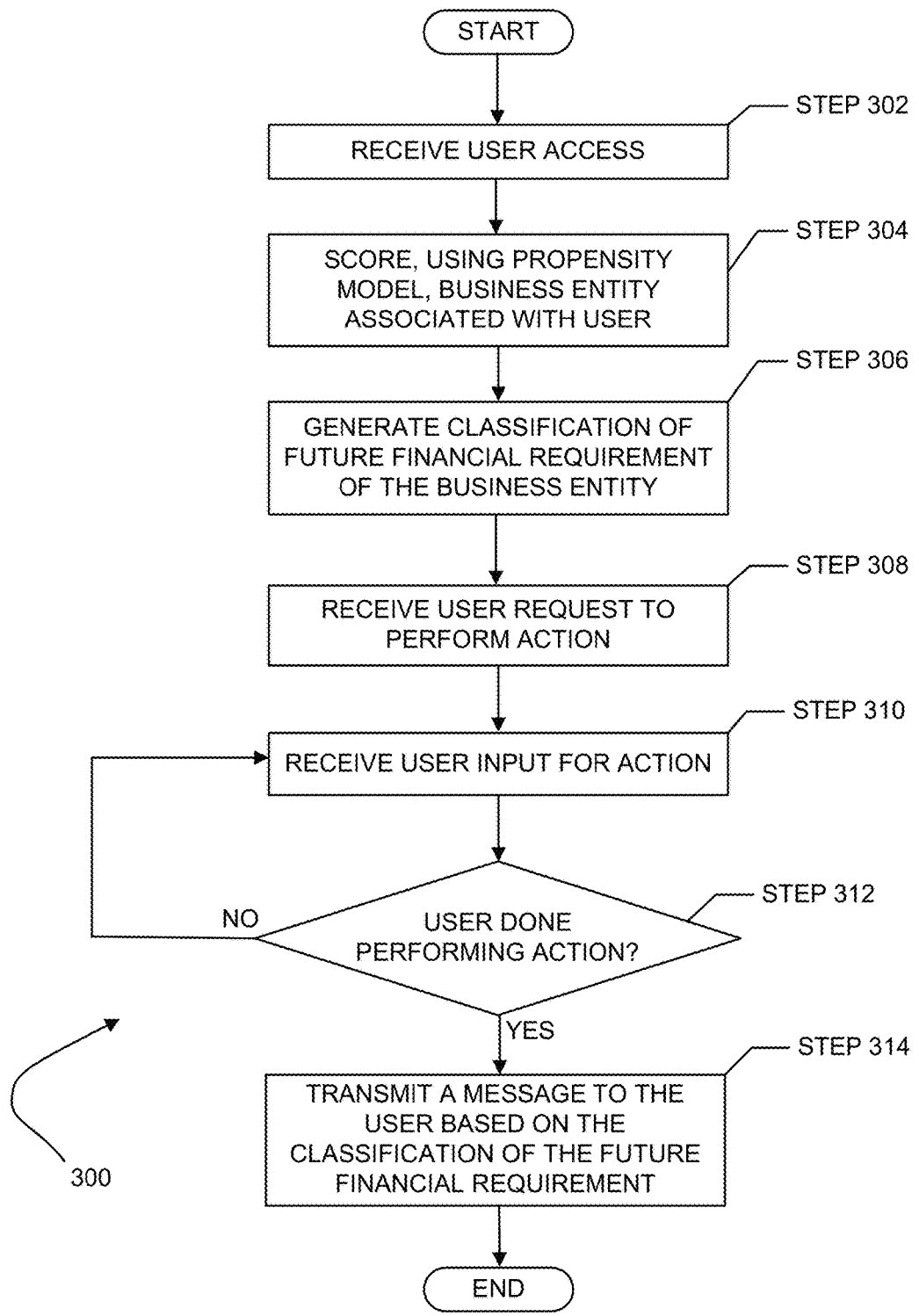
FIG. 3 illustrates a method of delaying the transmission of a message to a user associated with a business entity, in accordance with one or more embodiments of the invention.

FIG. 3 depicts a flowchart of a method (300) of delaying the transmission of a message to a user associated with a business entity, in accordance with one or more embodiments of the invention. In one or more embodiments, one or more of the steps shown in FIG. 3 may be omitted, repeated, and/or performed in a different order. Accordingly, embodiments of the invention should not be considered limited to the specific arrangements of steps shown in FIG. 3. In one or more embodiments, the method (300) described in reference to FIG. 3 may be practiced using the system (100) of FIG. 1A, the system (110) of FIGS. 1B and 1C, or the computing system (500) of FIG. 5A, and be based on the method described with respect to FIGS. 2A and 2B.

At Step 302, a user begins accessing a platform, such as, for example, a financial management platform. Moreover, the user is associated with a business entity. For example, the user may be the owner, manager, accountant of a business entity. As used herein, the access of the user includes any detectable user-based initiation to get, modify, or create data related to the business entity. For example, the access of the user may include the user logging in, waking from an idle state, etc.

Next, at Step 304, the business entity associated with the user is scored. The scoring of the business entity may proceed as described in the context of Step 226 of the method (200b) of FIG. 2B. Also, at Step 306, a classification of a future financial requirement of the business entity is generated. In one or more embodiments, the generation of the classification may proceed as described in the context of Step 228 of the method (200b) of FIG. 2B. Moreover, based on the generation of the classification, it is determined that the business entity of the user has a future financial need. For example, based on financial data and metadata stored on the platform on behalf of the business entity, it is determined that there is a strong probability the business entity will require a business loan in the next three months.

Additionally, at Step 308, a request is received from the user to perform an action. In one or more embodiments, the action may be any transaction-based business process. For example, the request from the user may include a request to enter invoices, close invoices, generate bills, enter payroll, track inventory, order stock, etc. In one or more embodiments, based on the user's request to perform the action, any transmission to the user, that is based on the classification of the future financial requirement of the business entity, may be delayed until the user has completed entering new data for the transactions.

Accordingly, at Step 310, the method (300) receives transaction data from the user, and, at Step 312, determines whether the user has finished entering transaction data. If the user has not finished entering transaction data, then the method (300) returns to Step 310, where additional transaction data is received from the user. In this way, the method (300) will continue to receive transaction data from the user until the user has finished entering transaction data.

For example, if, at Step 308, the user requests to enter invoices, then the method (300) will continue to allow the user to enter invoices until an indication is received from the user indicating that the user has finished. Similarly if, at Step 308, the user requests to enter payments that have been received, then the method (300) will continue to allow the user to enter payments until an indication is received from the user that the user has finished.

In one or more embodiments, the user may expressly indicate that he or she has finished entering transaction data. For example, the user may select a button or menu option indicating that he or she is finished. As another example, the user may save the transaction data, and attempt to exit the platform. As still yet another example, the user may return to a dashboard, or attempt to access another portion of the platform. More specifically, when the user has finished entering billing transaction data, the user may attempt to access payroll information. Accordingly, when the request is received that the user would like to access payroll, it may be determined, at Step 312, that the user has finished entering the transaction data and is done performing the action.

If, at Step 312 it is determined that the user has finished performing the action, the method (300) proceeds to Step 314, where a message is transmitted to the user based on the classification of the future financial requirement of the business entity, previously generated at Step 306. The transmission of the message at Step 304 may proceed as previously described in the context of Step 230 of FIG. 2B. In this manner, a business entity may be scored and identified as having a future financial requirement. However, rather than interrupt the workflow of the business entity, or its employees, the transmission of the message is temporarily delayed until the employees of the business entity are more likely to review the offer, and understand its applicability to their financial situation. For example, the employees of the business entity might better appreciate the need for a business loan after entering invoices, managing accounts receivable, running payroll, etc.

Referring now to FIGS. 4A, 4B, 4C, and 4D, a system (400a, 400b, 400c, 400d) illustrates the use of user data to augment a propensity model for determining a future financial requirement of a business entity, in accordance with one or more embodiments of the invention. The exemplary system (400a, 400b, 400c, 400d) may be practiced using the system (100) of FIG. 1A, the financial requirement prediction system (110) of FIGS. 1B and 1C, or the computing system (500) of FIG. 5A, and be based on the methods described with respect to FIGS. 2A and 2B as well as FIG. 3, above.

Figure 4A:
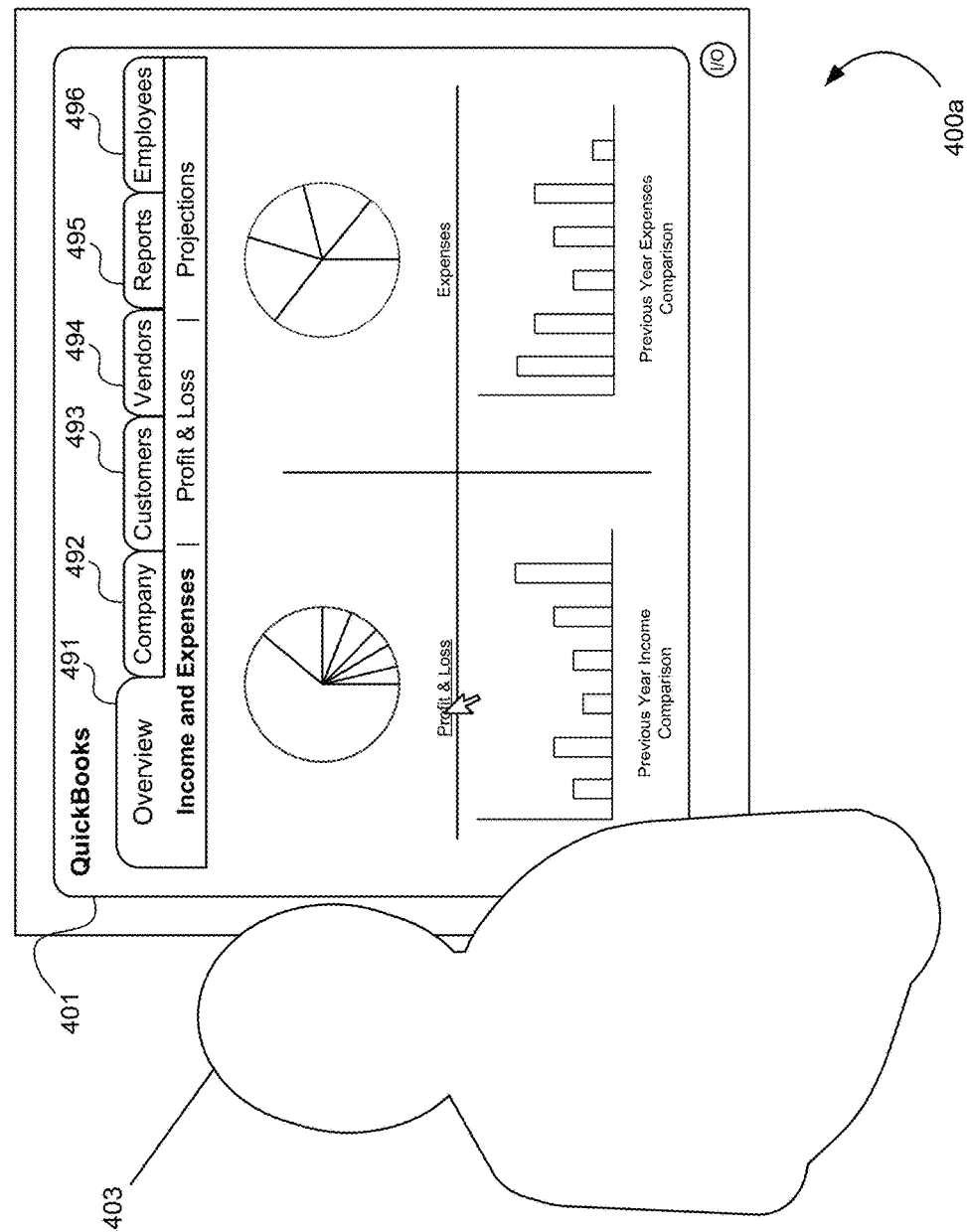
FIGS. 4A, 4B, 4C, and 4D illustrate the use of user data to augment a propensity model for determining a future financial requirement of a business entity, in accordance with one or more embodiments of the invention.

As shown in FIG. 4A, the system (400a) includes the interaction of a user (403) with a financial management platform (401). In one or more embodiments, the user may be an employee or owner of a business entity. Moreover, the financial management platform (401) may be hosted in a production environment, such as the production environment (104) described in the context of the system (100) of FIG. 1A.

As shown in FIG. 4A, for example, the financial management platform (401) includes different portions (491-496) for managing various different aspects of the commercial operations of the business entity. In particular, the financial management platform (401) includes: a first portion (491) that displays an overview of a status of the business entity (i.e., current profit & loss, current expenses, a year-over-year income comparison, and a year-over-year expenses comparison); a second portion (492) for viewing and managing corporate aspects of the business entity; a third portion (493) for viewing and managing the customers of the business entity; a fourth portion (494) for viewing and managing the vendors of the business entity; a fifth portion (495) for generating and viewing reports regarding the operations of the business entity; and a sixth portion (496) for viewing and modifying information regarding the employees of the business entity.

In one or more embodiments, the interaction of the user (403) with the financial management platform (401) may be monitored, as described hereinabove, to generate audit history data and/or clickstream data. For example, the navigation, selections, and/or clicks of the user (403) may be tracked to determine whether the user (403) is active within the financial management platform (401) or idle. As an option, the navigation, selections, and/or clicks of the user (403) may be tracked to determine the portions of the financial management platform (401) selected for viewing by the user (403), as well as for determining transaction creation or modification events, that may be recorded in audit history data.

Figure 4B:
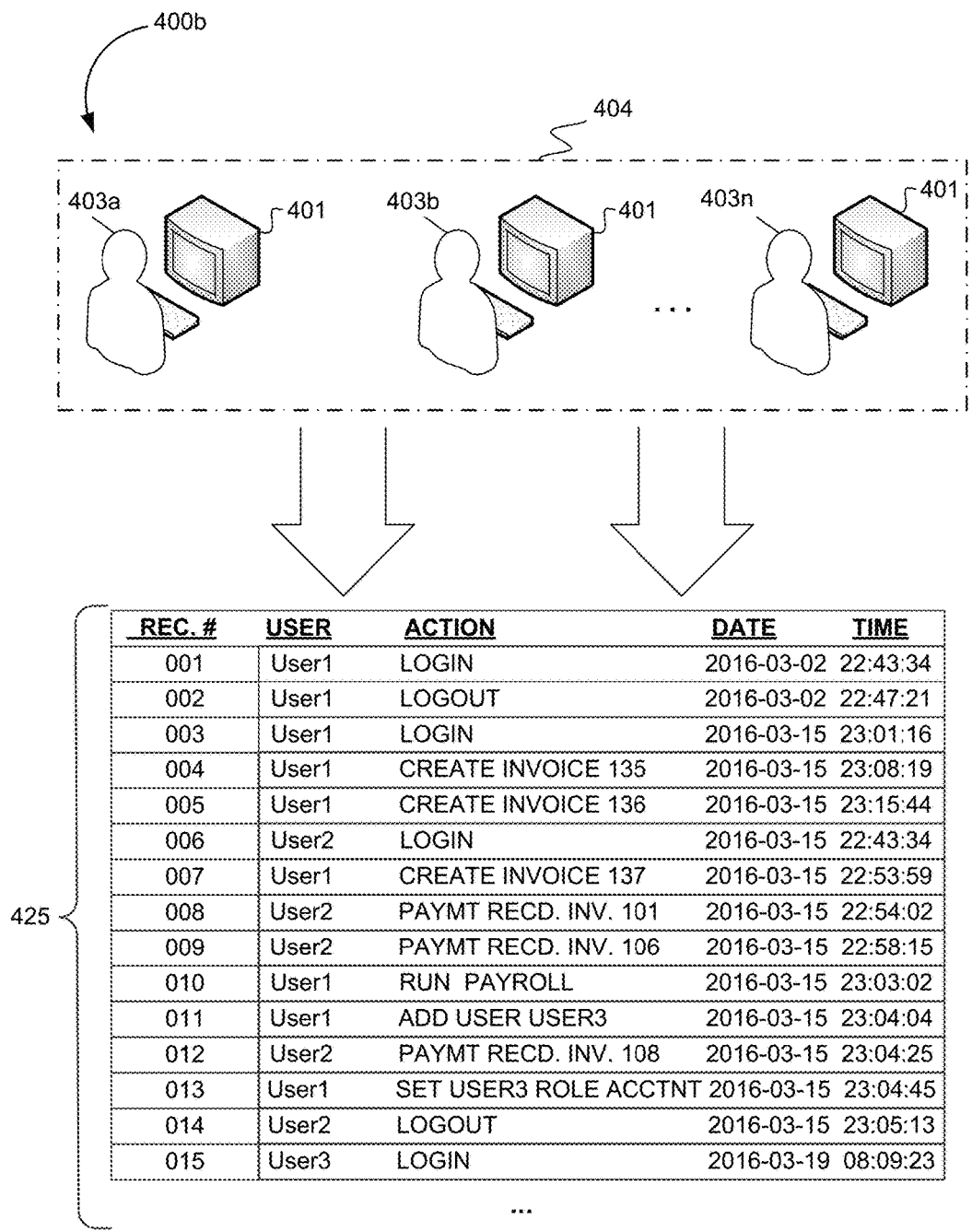

As illustrated by FIG. 4B, the system (400b) shows numerous different users (403a-403n) of a business entity (404) accessing the financial management platform (401) on behalf of the business entity (404). As an option, each of the users (403) may have a different role within the business entity (404). For example, a first user (403a) may be an owner of the business entity (403), a second user (403b) may be an accountant for the business entity (404), and a third user (403n) may be a cashier, tax preparer, etc. for the business entity (404). By associating, within the financial management platform (401), the different roles with the accounts of the respective users (403), behavioral patterns of certain roles may emerge. Such patterns may be used for building a financial need propensity model that is augmented by user data; or for determining a future financial need of the business entity (404) using a propensity model constructed based on the finances and actions of users associated with other business entities.

For example, the activities of the users (403) may be recorded as records within audit history data (425) of the business entity (404). As shown in FIG. 4B, the audit history data (425) of the business entity (404) includes a plurality of records (i.e., records 001-015, and beyond). Specifically, the records of the audit history data (425) identify various platform accesses or logins, transaction creation activities, transaction closing activities, personnel management activities, and other observed bookkeeping practices of the business entity.

More specifically, records 001, 003, 006, and 015 of the audit history data (425) identify accesses or logins (i.e., LOGIN) by a first user (i.e., Used), a second user (i.e., User2), and a third user (i.e., User3). As an option, the user accounts may correspond to different users associated with the business entity (404), such that the first user (403a) accesses the financial management platform (401) as User1, the second user (403b) accesses the financial management platform (401) as User2, and the third user (403n) accesses the financial management platform (401) as User3. Also, records 004-005 and 007 of the audit history data (425) identify invoice creation events performed by User1. In addition, records 008, 009, and 012 of the audit history data (425) identify invoice closing events performed by User2. Still yet, record 010 identifies a payroll execution event performed by User1, record 011 identifies the creation of the User3 account by User1, and record 013 identifies the configuration of the User3 account as having the role of accountant for the business entity (404).

For each of the records in the audit history data (425), a date and time of the event that triggered the creation of the record may be recorded. The date and time of each record may be used for reconstructing business entity data, as well as for determining or calculating behavioral patterns, such as week-over-week, month-over-month, etc. trends. Thus, the audit history data (425) includes a record of the discrete actions previously performed on the financial management platform (401), by the users (403) of the business entity (404), where the performed actions document the commercial activities and/or financial reporting activities of the business entity (404).

Figure 4C:
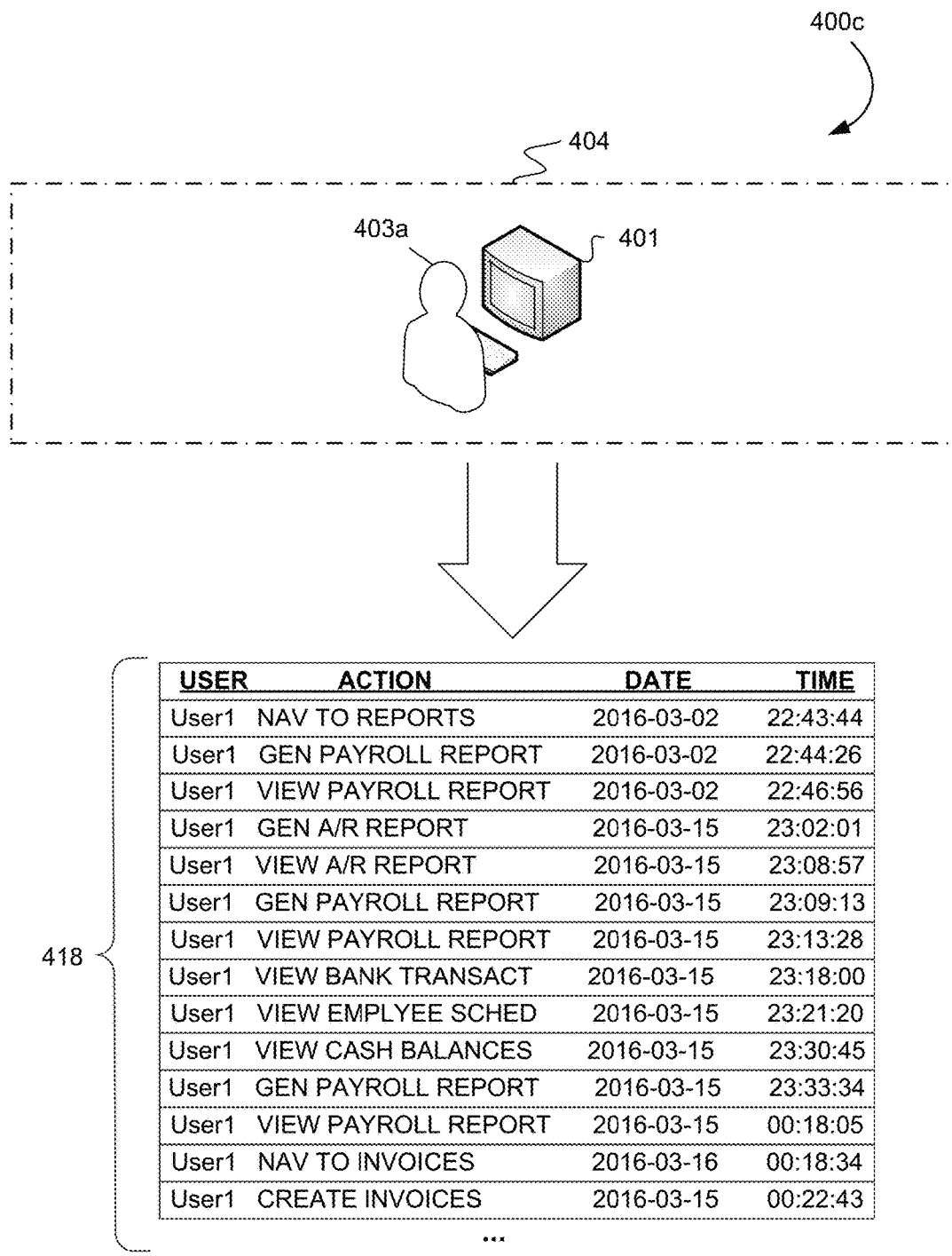

In addition, in one or more embodiments, clickstream data for one or more of the users (403) of the system (400c) may be recorded. For example, referring to FIG. 4C, clickstream data (418) is collected based on the interaction of the first user (403a) with the financial management platform (401). As shown in FIG. 4C, the clickstream data (418) includes various interactions that may not have a direct impact on the commercial activities of the business entity (404). More specifically, the clickstream data (418) identifies activities of User1 that include: navigating to a reports portion of the financial management platform (401), generating a payroll report, and viewing the payroll report. Further, the clickstream data (418) shows additional activities of User1 that include, on a different day: generating an accounts receivable report, and viewing the accounts receivable report, generating another payroll report and viewing the new payroll report, viewing bank transactions of the business entity (404), viewing an employee schedule, viewing cash balances of the business entity (404), and again generating and viewing another payroll report before navigating to an invoices portion of the financial management platform (401) to enter invoices.

In addition, the clickstream data (418) identifies a date and time for each of the tracked activities of User1. As an option, this information may be used to build a propensity model that identifies deterministic aspects of user behavior, and generates rules based on such features. For example, the intermittent movement of a user in and out of payroll reports, and between an accounts receivable report and banking information, may, in conjunction with financial data, be identified as a feature of a business entity that will likely require a business loan. Accordingly, a propensity model may be built that includes one or more rules for user activity patterns in view of financial data.

As an option, financial data of the business entity (404), in conjunction with the audit history data (425) and the clickstream data (418) of the business entity (404), may be applied to a propensity model built using the financial data, audit history data, and clickstream data of other business entities in the manner described above.

Figure 4D:
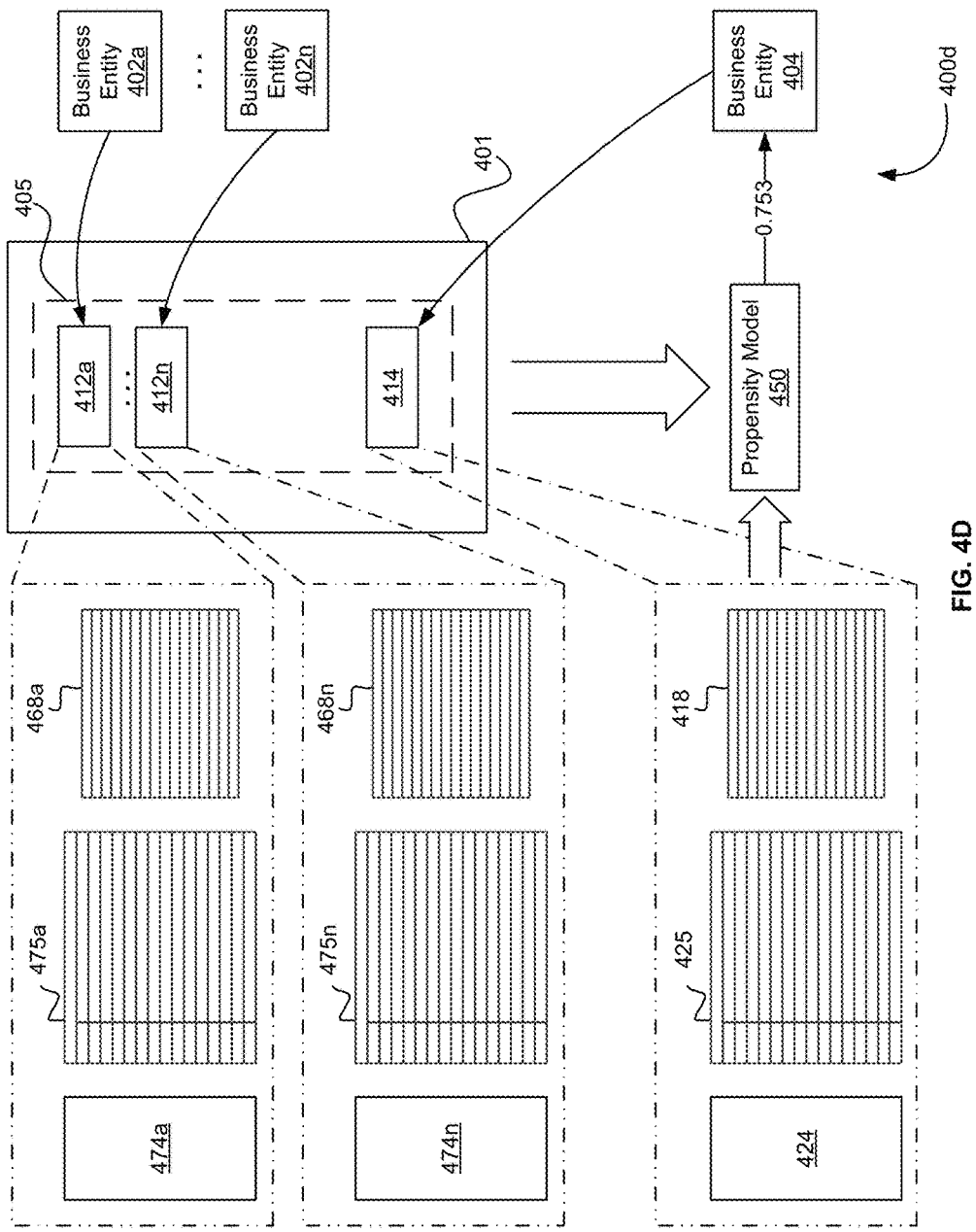

For example, as shown in FIG. 4D, the system (400d) shows a financial management platform (401) storing account data (405) for various business entities. In particular, the account data (405) includes business entity data (412) for various business entities (402). More particularly, the account data (405) includes first business entity data (412a) for a first business entity (402a), and second business entity data (412n) for a second business entity (402n). For purposes of simplicity and clarity, the financial management platform (401) is illustrated as storing the data for two business entities (402), and the following description describes the creation of the propensity model (450) using only the first and second business entity data (412a and 412n) of the respective business entities (402a and 402n). However, it is understood that the account data (405) may store data for hundreds, thousands, tens of thousands, or more business entities. Moreover, the propensity model (450) may be built using the data of hundreds, thousands, tens of thousands, or more business entities.

As illustrated in FIG. 4D, the first business entity data (412a) includes first financial data (474a), first audit history data (475a), and first clickstream data (468a) of the first business entity (402a). Similarly, the second business entity data (412n) includes second financial data (474n), second audit history data (475*n*), and second clickstream data (468*n*). The financial data (474) may be substantially identical to the financial data (124) previously described in the context of FIG. 1C. Similarly, the audit history data (475) may be substantially identical to the audit history data (125) previously described in the context of FIG. 1C and/or the audit history data (425) previously described in the context of FIG. 4B; and the clickstream data (468) may be substantially identical to the clickstream data (123) previously described in the context of FIG. 1C and/or the clickstream data (418) previously described in the context of FIG. 4C.

The propensity model (450) is built utilizing the business entity data (412) of the various business entities (402), and how the respective business entities (402) have previously responded to actionable offers for business loans. In particular, the first business entity (402*a*) showed an interest in an offer for a business loan by starting a corresponding loan application, while the second business entity (402*n*) did not show any interest in the offer for a business loan. Accordingly, the first business entity (402*a*) may be classified into a first population of business entities that have shown interest in actionable offers, while the second business entity (402*n*) is classified into a second, different, population of business entities that have not shown interest in actionable offers.

Next, for each of the business entities in one of the first or second populations, the data of the business entity is reconstructed to create a snapshot of the business entity at a pre-determined time prior to when the business entity received its respective actionable offer. In particular, the first business entity data (412*a*) is reconstructed to generate a snapshot representative of the first business entity (402*a*) three months prior to when it received the actionable offer. Similarly, the second business entity data (412*n*) is reconstructed to generate a snapshot representative of the second business entity (402*n*) three months prior to when it received the actionable offer. Accordingly, the reconstructed data for each of the business entities (402) includes audit history data (475) and clickstream data (468) generated by users associated with the corresponding business entity before its respective three month cutoff date. Also, the reconstructed data for each of the business entities (402) includes corresponding financial data (474) for the business entity before its respective three month cutoff date.

The propensity model (450) is built using the reconstructed data of the relevant business entities (402). In particular, the propensity model (450) is built to include numerous rules that, in combination, can be used to score another business entity (404), where the score is representative of a future financial need of the respective business entity (404). Specifically, the propensity model (450) includes the four rules set forth in Table 1. Each of the four rules of Table 1 is defined by one or more conditions. Also, each of the four rules of Table 1 is associated with a corresponding support value, coefficient, and importance value.

When applying the propensity model (450) to the data of a given business entity, the data of the business entity is compared with the various rules defined by the propensity model (450). For example, as illustrated by Table 1, the first rule of the propensity model (450) is defined by a condition based on year-over-year sales growth of the relevant business entity (i.e., YOY_SALES_GROWTH). The second rule of the propensity model (450) is defined by a condition based on month-over-month logins (i.e., MONTH_OVER_MONTH_LOGINS) by users associated with the relevant business entity. The third rule of the propensity model (450) is defined by two conditions. Specifically, the third rule includes a condition based on the number of times the users associated with the business entity have viewed its cash balance in a given week (i.e., WEEKLY_CASH_BALANCE_VIEW), and a condition based on a number of times the users associated with the business entity have viewed a payroll report in the given week (i.e., WEEKLY_PAYROLL_REPORT_VIEW). Finally, the fourth rule of the propensity model (450) includes a condition based on annual sales revenue of the business entity (i.e., ANNUAL_SALES_REVENUE) and a condition based on the number of times an accountant of the business entity accesses the financial management platform within a week (i.e., WEEKLY_ACCOUNTANT_LOGINS).

The audit history data (425) of FIG. 4B and the clickstream data (418) of FIG. 4C represent an incomplete view of the financial data and metadata of the business entity (404). In particular, the business entity (404) is a manufacturing company that is growing at a rate of 10% year-over-year. The business entity (404) has annual sales in excess of $500,000, and recently hired a part-time accountant to perform bookkeeping on a weekly basis. Also, because of a recent increase in demand for the product it manufacturers, the business entity (404) has spent $200,000 on equipment upgrades. These financial aspects of the business entity (404) are reflected in financial data (424) stored on the platform (401). The expenditures for equipment upgrades, in combination with the additional salary for the accountant, have begun to worry the owner of the business entity (404). Because of his worries, the owner of the business entity (404) has increased his frequency of logins to the financial management platform (401) to view payroll reports and cash balances.

As illustrated by FIG. 4D, the propensity model (450) is applied to the business entity data (414) of the business entity (404) to predict a future financial requirement of the business entity (404). In other words, the application of the propensity model (450) to the business entity data (414) enables a determination of whether the business entity (404) is likely to need a loan. This determination is based on the financial data (424), and augmented by user behavior information from the audit history data (425) and the clickstream data (418).

In particular, using the financial data (424) of the business entity data (414), it is determined that the business entity

TABLE 1

| Rule | Support | Coefficient | Importance | Definition |
|---|---|---|---|---|
| 1 | 0.527 | −0.556 | 100.0 | YOY_SALES_GROWTH <= 0.1925 |
| 2 | 0.567 | 0.156 | 98.0 | MONTH_OVER_MONTH_LOGINS >= 3 |
| 3 | 0.059 | 0.641 | 76.4 | WEEKLY_CASH_BALANCE_VIEW >= 2 & WEEKLY_PAYROLL_REPORT_VIEW >= 2 |
| 4 | 0.312 | 0.512 | 73.6 | ANNUAL_SALES_REVENUE >= 60925 & WEEKLY_ACCOUNTANT_LOGINS >= 1 |

(404) is growing at a rate of 10% year-over-year. Further, using the audit history data (425) of the business entity data (414), it is determined that, during the current month, the users (403) of the business entity (404) have accessed the financial management platform (401) at least three times more than they accessed the financial management platform (401) in the previous month. In addition, the clickstream data (418) of the business entity data (414) reflects that, during these accesses of the financial management platform (401), the users (403) are viewing a cash balance of the business entity (404) in excess of two times a week, and also viewing a payroll report of the business entity (404) in excess of two times a week. Finally, the financial data (424) of the business entity data (414) reflects that annual sales of the business entity (404) are in excess of $500,000, and the audit history data (425) indicates that the newly hired accountant is accessing the financial management platform (401) at least once per week.

Accordingly, because the sales growth of the business entity (404) is less than the 19.25% condition of rule 1, rule 1 is evaluated as true, and a value of 1 is multiplied by the coefficient of rule 1, −0.556. Also, because of the recent increase in logins to the financial management platform (401) by the owner and the accountant, users associated with the business entity (404) have accessed the financial management platform (401) at least three more times than they did last month. Because the condition of rule 2 is true, a value of 1 is multiplied by the coefficient of rule 2, 0.156. Similarly, with the owner of the business entity (404) viewing both cash balance and payroll reports multiple times a week, both conditions of rule 3 are true, and a value of 1 is multiplied by the coefficient of rule 3, 0.641. Finally, with annual sales in excess of $500,000, and an accountant that is now performing bookkeeping on a weekly basis, both conditions of rule 4 are true, and a value of 1 is multiplied by the coefficient of rule 4, 0.512. Each of these products is added together, to arrive at a sum of 0.753 (−0.556+0.156+0.641+0.512).

In one or more embodiments, the score of the business entity (404) may include the sum of 0.753. In one or more embodiments, the sum of 0.753 may be normalized, or otherwise adjusted, to arrive at a score for the business entity (404). For example, using the financial data and metadata of one or more additional business entities, similar comparisons may be made with the conditions of the rules of the propensity model (450), and additional sums calculated. One or more of the sums may fall outside of a range from 0-1. For example, a business entity with similar annual sales revenue and user behaviors as the business entity (404), but having year-over-year sales growth in excess of 19.25%, would result in rules 2-4 being evaluated as true, but not rule 1. As a result, a sum of 1.309 would be calculated for the business entity. Accordingly, the sums of all the business entities may be coordinately adjusted to arrive at a respective score between 0-1.

Moreover, based on the scores generated by applying the propensity model (450) to the metadata and financial data of various business entities, one or more business entities may be classified as likely to need a loan. For example, some entities may be classified as in great need of a loan, some business entities may be classified as in moderate need of a loan, and some business entities may be classified as without immediate need for a loan.

Based on each of these classifications, each of the business entities may be transmitted a message offering to help with the respective business entity's future financial requirement. For example, the business entity (404) may receive a targeted email or electronic advertisements based on its great need for a loan product. Also, a different business entity may receive a targeted postcard or other direct mailing based on its moderate need for a loan product.

In this manner, users or customers of a platform that are most in need of financing may be identified based on their financial data. Moreover, the identification of a future financial requirement is strongly augmented in view of metadata that evidences behavioral trends. Such behavioral trends may allow for greater insight than a review of the financial data alone. By identifying financial and behavioral trends in advance, users or customers may be targeted with compelling financing offers before they find themselves in an inconvenient or detrimental position. For example, by identifying the financial need of a business entity long before the owner of the business entity has realized the need, and by providing an enticing offer, the owner may begin early the process of applying for a low interest rate business loan, and avoid the pitfalls of a higher interest rate or short-term loan.

Figure 5A:
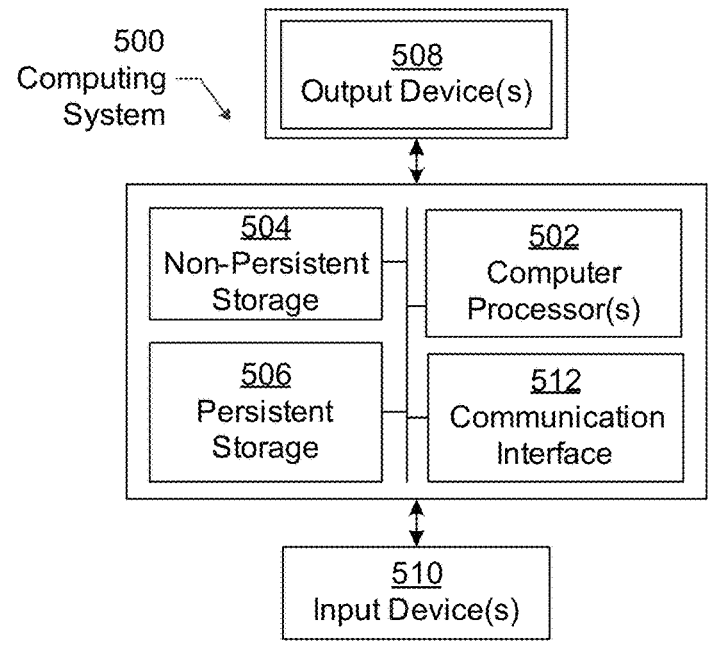
FIG. 5A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
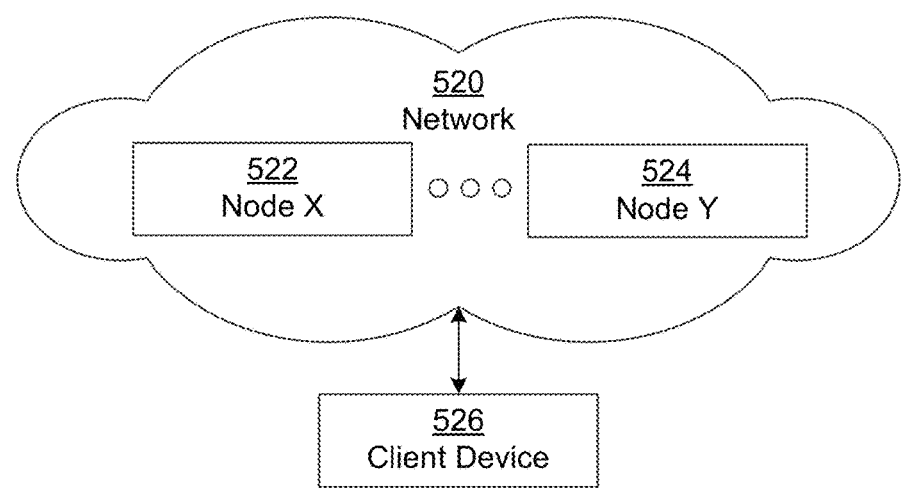
FIG. 5B shows a group of computing systems, in accordance with one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   obtaining a propensity model that models how data of a business entity relates to a future financial requirement of the business entity;
   obtaining audit history data including a record of discrete actions, previously performed on a platform, by users associated with the business entity;
   obtaining clickstream data including a record of performed actions that are performed on the platform by the users associated with the business entity, wherein the platform records, as at least a portion of the clickstream data being obtained, a navigation to a reports portion of the platform, a trigger for generation of a payroll report, and a view of the payroll report;
   gathering the data of the business entity,
      wherein the data includes financial data of the business entity and metadata,
      wherein the metadata includes the audit history data,
      wherein the metadata includes the clickstream data, and
      wherein the data matches at least a subset of the propensity model;
   scoring the business entity by applying the propensity model to the financial data, the audit history data, and the clickstream data;
   generating, based on the score of the business entity from the propensity model, the financial data, the audit history data, and the clickstream data, a classification of the future financial requirement of the business entity; and
   transmitting a message to the business entity based on the classification of the future financial requirement of the business entity.

2. The method of claim 1, wherein the discrete actions document one or more commercial activities and financial reporting activities of the business entity.

3. The method of claim 2, wherein the audit history data includes accesses of the platform by the one or more users associated with the business entity.

4. The method of claim 2, wherein the audit history data includes invoice creation events and invoice closing events performed by the one or more users associated with the business entity.

5. The method of claim 2, wherein the audit history data includes new user creation events performed by the one or more users associated with the business entity.

6. The method of claim 2, wherein the audit history data includes an identification of at least one of: an addition of an attachment to the platform by the one or more users associated with the business entity, and a removal of an attachment from the platform by the one or more users associated with the business entity.

7. The method of claim 1,
wherein the clickstream data includes a record of performed actions that are performed on the platform by the users associated with the business entity,
wherein the performed actions reflect one or more user preferences, habits, tendencies, and patterns of use of the platform,
wherein the performed actions do not directly affect commercial activities of the business entity;
wherein the clickstream data includes records of one or more of a time taken for entering an invoice, a time taken for closing an invoice, a time taken for entering an expense, a time spent between tasks, and an observed click path of a user, and
wherein the observed click path includes one or more of a navigational path utilized for arriving at a payroll portion of the platform, for viewing vendor information, and for viewing recent deposits.

8. The method of claim 7, wherein the clickstream data identifies report viewing activity of the one or more users associated with the business entity.

9. A system, comprising:
a hardware processor and memory; and
software instructions stored in the memory and configured to execute on the hardware processor, which, when executed by the hardware processor, cause the hardware processor to:
  obtain a propensity model that models how data of a business entity relates to a future financial requirement of the business entity;
  obtain audit history data including a record of discrete actions, previously performed on a platform, by users associated with the business entity;
  obtain clickstream data including a record of performed actions that are performed on the platform by the users associated with the business entity, wherein the platform records, as at least a portion of the clickstream data being obtained, a navigation to a reports portion of the platform, a trigger for generation of a payroll report, and a view of the payroll report;
  gather the data of the business entity,
    wherein the data includes financial data of the business entity and metadata,
    wherein the metadata includes the audit history data,
    wherein the metadata includes the clickstream data, and
    wherein the data matches at least a subset of the propensity model;
  score the business entity by applying the propensity model to the financial data, the audit history data, and the clickstream data;
  generate, based on the score of the business entity from the propensity model, the financial data, the audit history data, and the clickstream data, a classification of the future financial requirement of the business entity; and
  transmit a message to the business entity based on the classification of the future financial requirement of the business entity.

10. The system of claim 9, wherein the discrete actions document one of commercial activities and financial reporting activities of the business entity.

11. The system of claim 10, wherein the audit history data includes accesses of the platform by the one or more users associated with the business entity.

12. The system of claim 10, wherein the audit history data includes invoice creation events and invoice closing events performed by the one or more users associated with the business entity.

13. The system of claim 10, wherein the audit history data includes new user creation events performed by the one or more users associated with the business entity.

14. The system of claim 10, wherein the audit history data includes an identification of at least one of: an addition of an attachment to the platform by the one or more users associated with the business entity, and a removal of an attachment from the platform by the one or more users associated with the business entity.

15. The system of claim 9,
wherein the clickstream data includes a record of performed actions that are performed on the platform by the users associated with the business entity,
wherein the performed actions reflect one or more user preferences, habits, tendencies, and patterns of use of the platform,
wherein the performed actions do not directly affect commercial activities of the business entity;
wherein the clickstream data includes records of one or more of a time taken for entering an invoice, a time taken for closing an invoice, a time taken for entering an expense, a time spent between tasks, and an observed click path of a user, and
wherein the observed click path includes one or more of a navigational path utilized for arriving at a payroll portion of the platform, for viewing vendor information, and for viewing recent deposits.

16. The system of claim 15, wherein the clickstream data identifies report viewing activity of the one or more users associated with the business entity.

17. A non-transitory computer readable medium storing instructions, the instructions, when executed by a computer processor, comprising functionality for:
  obtaining a propensity model that models how data of a business entity relates to a future financial requirement of the business entity;
  obtaining audit history data including a record of discrete actions, previously performed on a platform, by users associated with the business entity;
  obtaining clickstream data including a record of performed actions that are performed on the platform by the users associated with the business entity, wherein the platform records, as at least a portion of the clickstream data being obtained, a navigation to a reports portion of the platform, a trigger for generation of a payroll report, and a view of the payroll report;
  gathering the data of the business entity,
    wherein the data includes financial data of the business entity and metadata,
    wherein the metadata includes the audit history data,
    wherein the metadata includes the clickstream data, and
    wherein the data matches at least a subset of the propensity model;
  scoring the business entity by applying the propensity model to the financial data, the audit history data, and the clickstream data;
  generating, based on the score of the business entity from the propensity model, the financial data, the audit history data, and the clickstream data, a classification of the future financial requirement of the business entity; and transmitting a message to the business entity based on the classification of the future financial requirement of the business entity.

18. The non-transitory computer readable medium of claim 17, wherein the discrete actions document one of commercial activities and financial reporting activities of the business entity.

19. The non-transitory computer readable medium of claim 18, wherein the audit history data includes accesses of the platform by the one or more users associated with the business entity.

20. The non-transitory computer readable medium of claim 18, wherein the audit history data includes invoice creation events and invoice closing events performed by the one or more users associated with the business entity.

21. The non-transitory computer readable medium of claim 18, wherein the audit history data includes new user creation events performed by the one or more users associated with the business entity.

22. The non-transitory computer readable medium of claim 18, wherein the audit history data includes an identification of at least one of: an addition of an attachment to the platform by the one or more users associated with the business entity, and a removal of an attachment from the platform by the one or more users associated with the business entity.

23. The non-transitory computer readable medium of claim 17,
wherein the clickstream data includes a record of performed actions that are performed on the platform by the users associated with the business entity,
wherein the performed actions reflect one or more user preferences, habits, tendencies, and patterns of use of the platform,
wherein the performed actions do not directly affect commercial activities of the business entity,
wherein the clickstream data includes records of one or more of a time taken for entering an invoice, a time taken for closing an invoice, a time taken for entering an expense, a time spent between tasks, and an observed click path of a user,
wherein the observed click path includes one or more of a navigational path utilized for arriving at a payroll portion of the platform, for viewing vendor information, and for viewing recent deposits, and
wherein the clickstream data identifies report viewing activity of the one or more users associated with the business entity.

* * * * *